United States Patent [19]

Danno et al.

[11] E Patent Number: Re. 33,027

[45] Reissued Date of Patent: Aug. 22, 1989

[54] ENGINE IDLING SPEED CONTROLLING SYSTEM

[75] Inventors: Yoshiaki Danno; Akira Takahashi; Kazumasa Iida; Toru Hashimoto; Yasukuki Okamoto; Kenzo Nakao, all of Kyoto, Japan

[73] Assignee: Mitsubishi Jidosha Kogyo Kabushiki Kaisha, Tokyo, Japan

[21] Appl. No.: 178,903

[22] Filed: Apr. 7, 1988

Related U.S. Patent Documents

Reissue of:

[64] Patent No.: 4,580,535
Issued: Apr. 8, 1986
Appl. No.: 740,226
Filed: Jun. 3, 1985

[30] Foreign Application Priority Data

Jun. 8, 1984 [JP] Japan ..... 59-117498
Apr. 1, 1985 [JP] Japan ..... 60-68677

[51] Int. Cl.[4] ..... F02B 41/16

[52] U.S. Cl. ..... 123/339; 123/340; 123/361

[58] Field of Search ..... 123/339, 340, 361, 399, 123/403, 395

[56] References Cited

U.S. PATENT DOCUMENTS 4,344,399 8/1982 Matsumura et al. ..... 123/339
4,444,168 4/1984 Matsumura et al. ..... 123/339
4,491,922 1/1985 Kobayashi et al. ..... 123/339
4,506,642 3/1985 Pfalzgraf et al. ..... 123/361
4,508,075 4/1985 Takao et al. ..... 123/339
4,508,076 4/1985 Oda et al. ..... 123/339
4,509,477 4/1985 Takao et al. ..... 123/339

*Primary Examiner*—Raymond A. Nelli
*Attorney, Agent, or Firm*—Emmanuel J. Lobato; Robert E. Burns

[57] ABSTRACT

An engine idling speed controlling system including, for controlling the throttle valve opening appropriately, a first idling speed control means for comparing a detected signal provided from an engine speed sensor during idle running with a target engine idling speed and providing a first idling control signal, a correction value learning means for learning a long-time correction value or a just-previous correction value on the basis of a cumulative value of the newest value of a detected signal provided from a throttle position sensor during operation of the first idling speed control means, a second idling speed control means for comparing a detected signal provided from the throttle position sensor during idle running with a target throttle opening, receiving the long-time correction value and the just-previous correction value and producing a second idling control signal, and means for controlling the idle opening of the throttle valve in accordance with one of the first and second idling control signals.

14 Claims, 19 Drawing Sheets

| FIG. 8A | FIG. 8B |
|---|---|

| FIG. 14A | FIG. 14B |
|---|---|

| FIG. 15A | FIG. 15B |
|---|---|

ENGINE IDLING SPEED CONTROLLING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a system for controlling an idle running condition of an engine and particularly to a system for controlling an idling speed of a vehicular engine.

2. Description of the Prior Art

Heretofore, there has been proposed a vehicular engine idling speed controlling system in which engine speed, throttle valve opening, vehicle speed, etc. are detected respectively by engine speed sensor, throttle position sensor, vehicle speed sensor, etc. and a control signal based on those detected signals is fed to an actuator (motor) of a stopper member (rod) which restricts a stop position on a closing side of a throttle valve, to move the rod forward or backward to shift the closing side stop position of the throttle valve, thereby effecting an engine speed feedback control (NFB control) under a certain condition I during idle running, while permitting a throttle valve position feedback (PFB) control under another condition II during idle running.

The above condition I indicates the case where at least the following requirements are satisfied, in which the engine is in a relatively stable state:

(1) A predetermined time should have been elapsed after changing from OFF to ON of an idle switch.

(2) The vehicle speed be extremely low (e.g. not higher than 2.0 km/h); in other words, a signal frequency provided from a vehicle speed sensor which detects a vehicle speed using a pulse signal having a frequency porportional to a vehicle speed, should be not higher than a predetermined value.

(3) In a vehicle having a cooler, a predetermined time should have been elapsed after switching over of a cooler relay or the like according to a cooler load.

(4) In a vehicle having an automatic transmission with turbo type fluid coupling, a predetermined time should have been elapsed after switch-over of speed change range from neutral range (including parking range) to running range or vice versa.

The above condition II indicates the case where the above condition I is not satisied, the engine is not relatively stable, and a rapid feedback control is desired.

In conventional engine idling speed controlling systems, when the idling speed control is made according to PFB control under the above condition II, the throttle opening is determined in accordance with a detected signal (actual throttle opening signal) provided from a throttle sensor, but there exists the problem that the relation between actual throttle opening and engine idling speed changes due to a setting error of the throttle sensor or a change with time of friction of a driving mechanism for a throttle valve.

In an attempt to solve the above problem there has been proposed a learning means which stores the relation between throttle valve position and engine speed during NFB control and makes a correction control using such stored value during PFB control. However, the following problems are involved therein.

(1) If the relation between throttle opening and engine speed is corrected always with the newest data, then in the event the load in NFB control changes in PFB control, particularly in the event of a lighter load in PFB control, the engine speed rises and the feeling becomes worse. For example, there arises an engine speed rise of about 400 rpm at a power steering load, and also at an electric load there arises an engine speed rise not less than 200 rpm.

(2) If the relation between throttle opening and engine speed is corrected with a mean value over a long time, the engine speed varies when an electric load turns ON and the load increases under conditions under which NFB control and PFB control are repeated frequently.

SUMMARY OF THE INVENTION

The present invention has been accomplished in order to solve the above-mentioned problems, and it is the object thereof to provide an engine idling speed controlling system capable of minimizing the variation of engine idling speed in position feedback control by correcting appropriately a throttle opening detected by a throttle position sensor.

To achieve the above object, the engine idling speed controlling system of the present invention is characterized by including a stopper member for restricting a stop position on a closing side of a throttle valve mounted in an intake passage of an engine; an actuator for actuating the stopper member to change said closing side stop position to thereby control the opening of the throttle valve; a throttle position sensor for detecting an opening of the throttle valve; an engine speed sensor for detecting the number of revolution of the engine; a first idling speed control means for comparing a detected signal from the engine speed sensor with a target idling speed of the engine when the throttle valve is under control by the actuator and providing to the actuator a first idling control signal obtained from the result of said comparison; a second idling speed control means for comparing a detected signal from the throttle position sensor with a target idle opening of the throttle valve when the throttle valve is under control by the actuator and providing to the actuator a second idling control signal obtained from the result of said comparison; an operation control means for controlling the operation of the first idling speed control means and that of the second speed control means; and a correction value learning means for learning a correction value for the second idling control signal on the basis of a detected signal from the throttle position sensor during operation of the first idling speed control means, the correction value learning means being constructed so as to determine as said correction value both a long-time correction value based on a cumulative evaluation of detected signals from the throttle position sensor during operation of the first idling speed control means and a just-previous correction value based on the newest detected signal from the throttle position sensor during operation of the first idling speed control means, and the second idling speed control means being constructed so as to receive the long-time correction value and just-previous correction value determined by the correction value learning means and obtain the second idling control signal in order to relect the learning results of the correction value learning means in the second idling control signal.

In the engine idling speed controlling system of the present invention, for making position feedback control of the throttle valve when the throttle valve is under actuator control, both a long-time correction value and a just-previous correction value are determined by the correction value learning means upon receipt of a correction value which has been learned in advance on the basis of a detected signal from the throttle position sensor in the engine speed feedback control, and the second idling control signal from the second idling speed control means is corrected on the basis of those correction values. And on the basis of this second idling control signal, the stopper member is driven by the actuator to control the throttle opening during idle running.

According to the engine idling speed controlling system of the present invention, therefore, the following effects or advantages can be obtained by a simple construction.

(1) Error of a detected value based on a setting error of the throttle position sensor as well as a change with time of friction of a driving mechanism for the throttle valve can be decreased and therefore a more accurate position feedback control can be effected.

(2) In the first and second idling speed control means, upon receipt of both long-time correction value and just-previous correction value, it is possible to control small the variation between the throttle opening in the engine speed feedback control and that in the position feedback control.

(3) By the above (2) it is made possible to reduce the variation of the engine idling speed even against variations in engine load and electric load, thereby prevent the feeling from becoming worse.

BRIEF DESCRIPTION OF THE DRAWINGS

FIGS. 1 to 13 illustrate an engine idling speed controlling system according to a first embodiment of the present invention, of which:

FIG. 1 is an entire block diagram thereof;

FIG. 2 is a block diagram of a principal portion thereof;

FIGS. 3 to 6 are graphs illustrative of operations;

FIGS. 7 to 12 are flowcharts illustrative of operations; and

FIG. 13 is a graph illustrative of operation;

FIGS. 14 to 21 illustrate an engine idling speed controlling system according to a second embodiment of the present invention, of which:

FIGS. 14 to 19 are flowcharts illustrative of operations, and

FIGS. 20 and 21 are graphs illustrative of operations; and

DETAILED DESCRIPTION OF THE PREFERRED EMBODIMENTS

Figure 1:
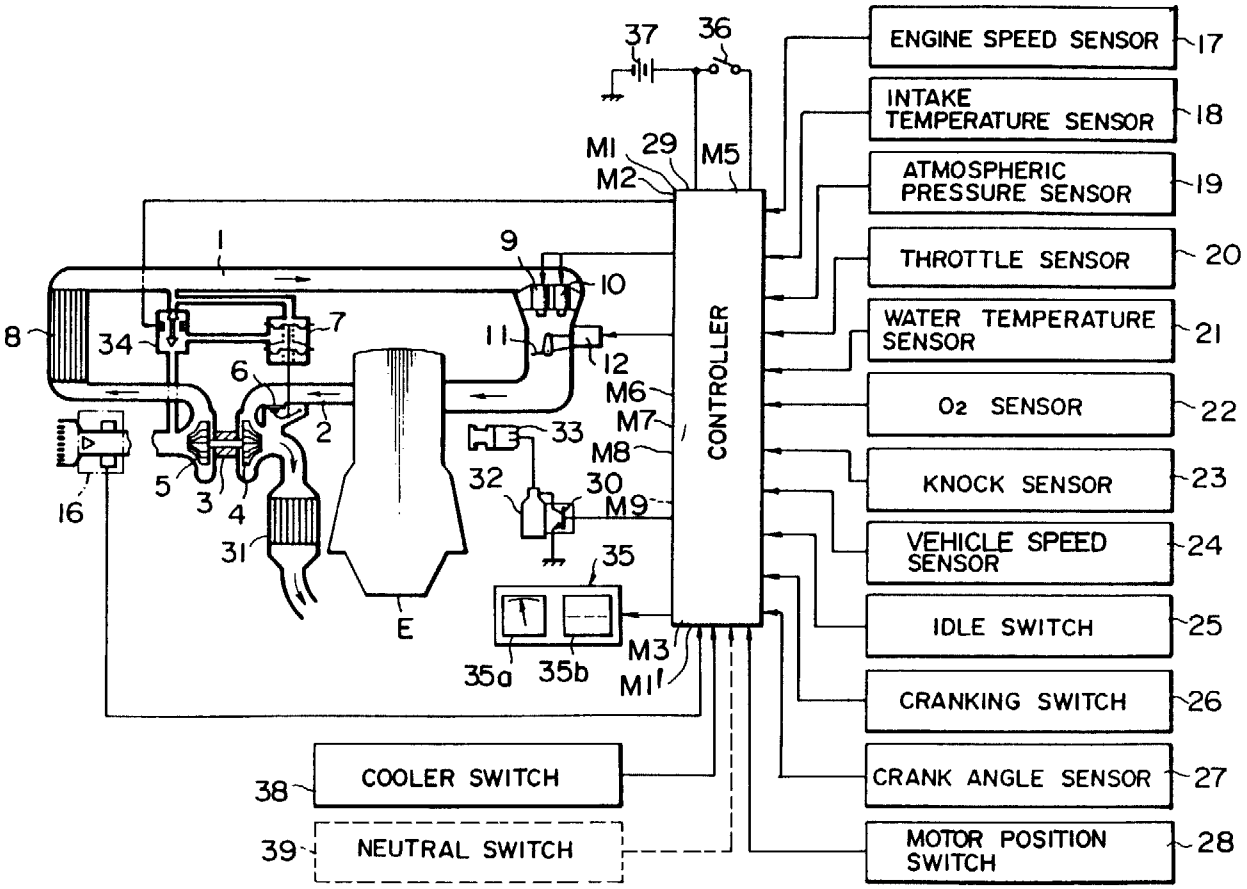

As shown in FIG. 1, an internal combustion engine E (hereinafter referred to simply as "engine E") such as a vehicular gasoline engine in this embodiment has a turbo-charger 3. The turbo-charger 3 has a turbine 4 which is mounted in an exhaust passage 2 of the engine E, and a compressor 5 which is mounted in an intake passage 1 of the engine E and which is driven for rotation by the turbine 4.

Connected to the exhaust passage 2 is a by-pass which by-passes the portion of the exhaust passage 2 where the turbine is disposed, and a waste gate valve 6 is provided for opening and closing this by-pass. The waste gate valve 6 is adapted to be driven for opening and closing motion by means of a two-diaphragm type pressure response unit 7. Atmospheric pressure and supercharging pressure are selectively fed in one pressure chamber of the pressure response unit 7 by means of an electromagnetic change-over valve 34 (which has a return spring not shown for a valve member) to adjust the opening timing, etc. of the waste gate valve 6, whereby at least two kinds of supercharging pressure characteristics can be realized.

In the intake passage 1 of the engine E are mounted, successively from its upstream side (air cleaner side), air flow sensor 16, compressor 5 of the turbo-charger 3, intercooler 8, electromagnetic fuel injection valves 9 and 10 (which are differs in injection volume) and throttle valve 11, while in the exhaust passage 2 of the engine E are mounted, successively from its upstream side (engine combustion chamber side), turbine 4 of the turbo-charger 3, catalyst converter 31 and muffler (not shown).

Figure 2:
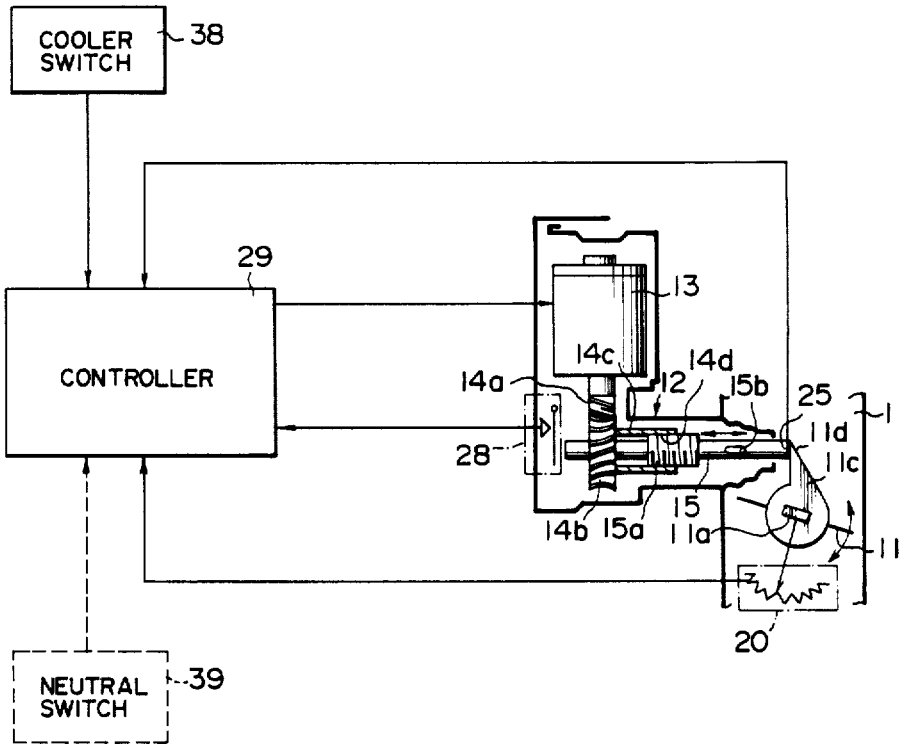

As shown in FIG. 2, a stem 11a of the throttle valve 11 disposed in the intake passage 1 of the engine E is connected to a throttle lever 11c exteriorly of the intake passage 1. To an end portion 11d of the throttle lever 11c is connected a wire (not shown) which, upon depression of an accelerator pedal (not shown), causes the throttle valve 11 to pivot in a clockwise direction (opening direction) in FIG. 2 through the throttle lever 11c. Further, a return spring (not shown) is attached to the throttle valve 11 for urging the latter in a closing direction, whereby the throttle valve 11 is closed as the wire tension is weakened.

Further provided is an actuator 12 for controlling the opening of the throttle valve 11 during idle running of the engine. The actuator 12 is provided with a DC motor (hereinafter referred to simply as "motor") 13 having a worm 14a formed on its rotational shaft. The worm 14a with motor 13 is in mesh with an annular worm wheel 14b. Integral with the worm wheel 4b is a pipe shaft 14c having an internal thread portion 14d, and a rod (stopper member) 15 having an external thread portion 15a engaged with the internal thread portion 14d of the pipe shaft 14c extends through the worm wheel 14b and pipe shaft 14c.

When the throttle valve 11 is located on its closing side (e.g. fully closed), a fore end portion of the rod 15 comes into abutment with the end portion 11d of the throttle lever 11c through on idle switch 25 which constitutes an idle sensor as an operating condition detecting means. Thus, the closing-side stop position of the throttle valve 11 is restricted by the rod 15.

The idle switch 25 turns ON (closed) when the throttle valve 11 is in a closing-side stop position (at this time the engine assumes an idle running state if the engine speed is below a predetermined value), and turns OFF (open) under other conditions.

The rod 15 is formed with a long hole 15b, in which is guided a pin (not shown) provided on the body side of the actuator, thereby preventing rotation of the rod 15.

Thus, the fore end portion of the rod 15 is in abutment with the throttle lever during idle running of the engine E, so when the rod 15 is projected (advanced) from the actuator 12 by rotating the motor 13 in a certain direction and thereby rotating the pipe shaft 14c through the worm gear, the throttle valve 11 is opened, while by rotating the motor 13 in the reverse direction and retracting (moving back) the rod 15 into the actuator 12, the throttle valve 11 is allowed to be closed by the action of the return spring. In this way, the fully closed stop position of the throttle valve 11 is changed by driving the rod 15, thereby permitting control of the idle opening of the throttle valve 11.

As a throttle position sensor for detecting the opening (throttle opening) of the throttle valve 11, there is provided a throttle sensor 20. An example of the throttle sensor 20 is a potentiometer which produces a voltage proportional to the throttle opening.

Moreover, as shown in FIG. 1, a water temperature sensor 21 for detecting a cooling water temperature TW as a warming-up temperature of the engine E is provided, and also provided is an engine speed sensor 17 which detects an engine speed on the basis of, for example, ignition pulse information obtained from a primary-side minus terminal of an ignition coil 32.

Further provided is a vehicle speed sensor 24 which detects a vehicle speed by the use of a pulse signal having a frequency proportional to the vehicle speed. An example of the vehicle speed sensor 24 is a known lead switch.

Additionally, a cranking switch 26 as a cranking sensor for detecting an engine cranking condition is provided, which turns ON (closed) upon turning ON of a self-starting motor, and turn OFF (open) under other conditions.

The air flow sensor 16 is for detecting the number of Karman's vortex street produced by a cylindrical body disposed in the intake passage 1, by an ultrasonic modulator means or from a change in resistance value, thereby detecting an intake air volume in the intake passage 1. A digital output from the air flow sensor 16 is input to a controller 29. The controller 29 has functions as first and second idling speed control means M1 and M1', a long-time correction value learning means M2 and a just-previous correction value learning means M3 both as correction value learning means, an initializing means M5 for initializing in a predetermined operating condition, an operation control means M6 for controlling the operation of the first and second idling speed control means, a first memory means M7 for storing data on long-time correction value, and a second memory means M8 for storing data on just-previous correction value.

A digital output from the air flow sensor 16 is applied to say a ½ frequency divider in the controller 29 and then fed to various processings.

It is generally said that an intake pulsation or the like causes the air flow sensor 16 to operate erroneously in a low speed high load condition of the engine E. In this embodiment, however, the intercooler 8 is provided on a downstream side of the air flow sensor 16 and the size, etc. of the air cleaner portion are adjusted suitably, resulting in that there scarcely occurs such intake pulsation. Therefore, the measurement reliability or accuracy of the air flow sensor 16 is presumed to be sufficiently high.

In addition to the above sensors and switches, there are provided an intake temperature sensor 18 for detecting an intake temperature, an atmospheric pressure sensor 19 for detecting an atmospheric pressure, an $O_2$ sensor 22 for detecting an oxygen concentration in exhaust gas, a knock sensor 23 for detecting a knocking condition of the engine, a crank angle sensor 27 for detecting a crank angle using an optoelectro transducer means with distributor 33, a motor position switch 28 for detecting a position (reference position) of the rod 15 with actuator 12 corresponding to a reference opening (this opening is set as a small opening corresponding to an engine speed of say 600 rpm) of the throttle valve 11, and a cooler switch (cooler SW) 38 as a load sensor. Signals from those sensors and switches are input to the controller 29.

The motor position switch 28 is provided behind the rear end face of the rod 15 as shown in FIG. 2 and it is adapted to turn ON (closed) in the vicinity of the most retreated condition of the rod 15 and turn OFF (open) under other conditions.

As to the intake temperature sensor 18, atmospheric pressure sensor 19, water temperature sensor 21, throttle sensor 20, $O_2$ sensor 22 and knock sensor 23, their detection signals are analog signals, so are fed to the controller 29 through an A/D converter. The atmospheric pressure sensor 19 may be incorporated in the controller 29.

Also provided is an ignition coil 32 whose primary current is made intermittent by a power transistor 30 serving as a switching transistor.

Further, an indicator 35 is provided in the vehicle room. An example of an indicator is an indicator having a pointer type indicating portion 35a or an indicator having a segment type indicating portion 35b in which light emitting diodes (LED) are arranged in a row and they go on and off.

The controller 29 comprises a CPU or a microcomputer having a memory (including a map) and a suitable input/output interface. It is connected to a battery (power source) 37 through an ignition key switch 36 and is adapted to start operation after turning ON of the switch 36. The controller 29 has a function as the first idling speed control means M1 which outputs to the motor 13 of the actuator 12 a first idling control signal for performing the engine speed feedback control in accordance with a signal from the engine speed sensor 17 under the preset condition I during detection of idle running by the idle switch 25 (when the idle switch is ON and the engine speed is lower than a predetermined value). The controller 29 also has a function as the second idling speed control means M1' which outputs to the motor 13 of the actuator 12 a second idling control signal for performing the position feedback control of the throttle valve 11 in accordance with a signal from the throttle sensor 20 under the other present condition II during the above idling detection.

Figure 3:
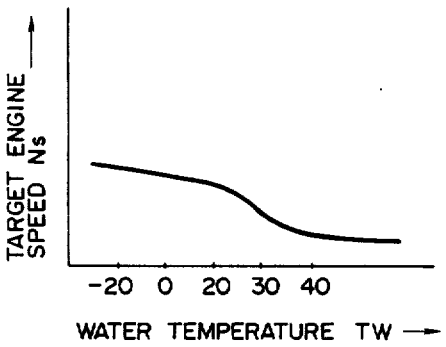
Figure 4:
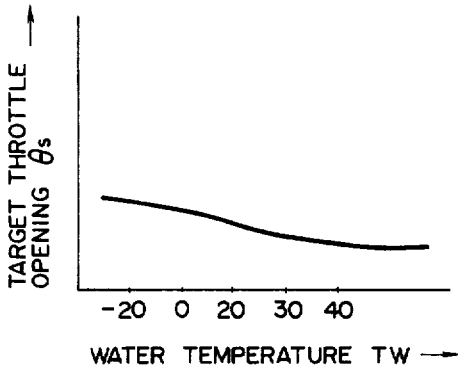

In performing the engine speed feedback control, a target engine speed Ns is changed according to cooling water temperatures TW as shown in FIG. 3, while in performing the position feedback control, a target throttle opening $\theta s$ is changed according to cooling water temperature TW as shown in FIG. 4.

Figure 6:
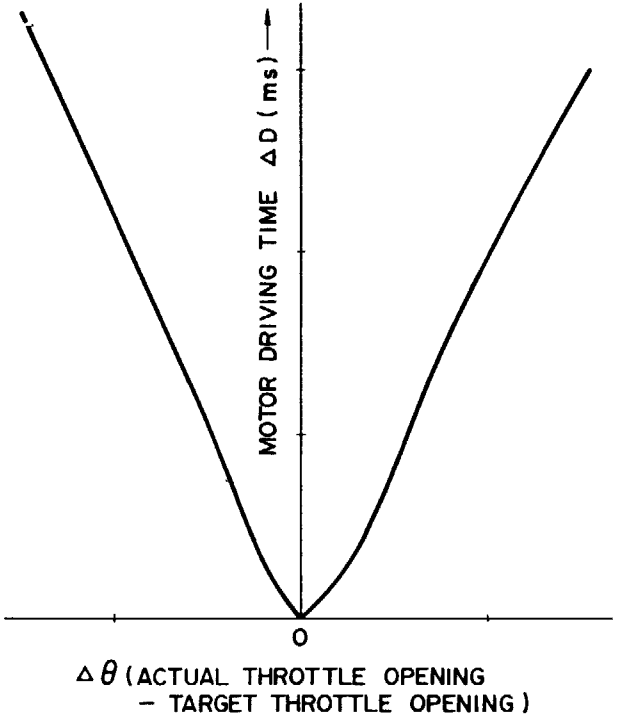
Figure 5:
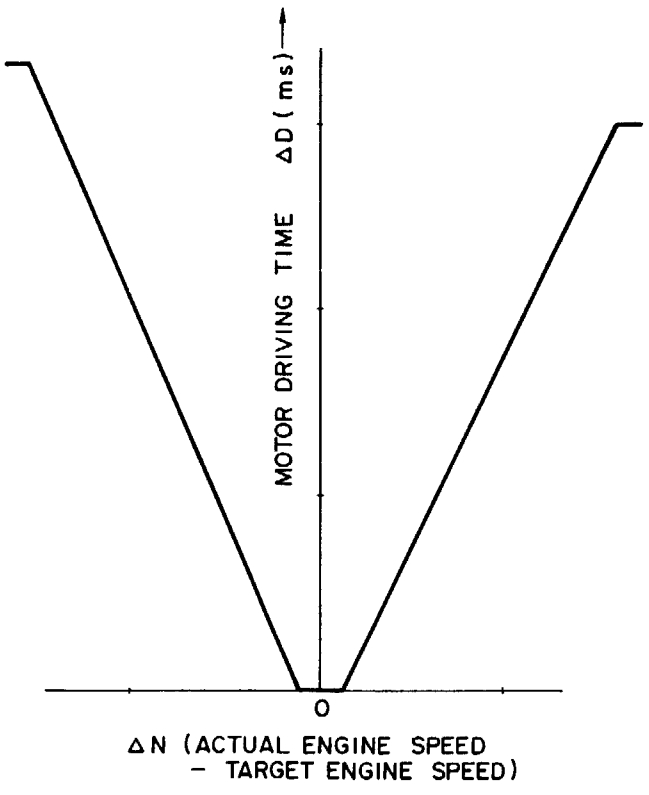

Further, the relation between a driving time $\Delta D$ of the motor 13 of the actuator 12 and a deviation $\Delta N$ and that between such driving time and a deviation $\Delta\theta$ are as shown in FIGS. 5 and 6. The deviation $\Delta N$ means a difference between actual engine speed Nf and target engine speed Ns, while the deviation $\Delta\theta$ means a difference between actual throttle opening $\theta f$ and target throttle opening $\theta s$.

The condition I is as previously described as (1) to (3), to which there may be added a requirement that the deviation of the actual engine speed from the target speed should be within a predetermined range. The condition II is of the case where the condition I is not satisfied, the engine is not relatively stable and a rapid feedback control is desired.

Figure 7:
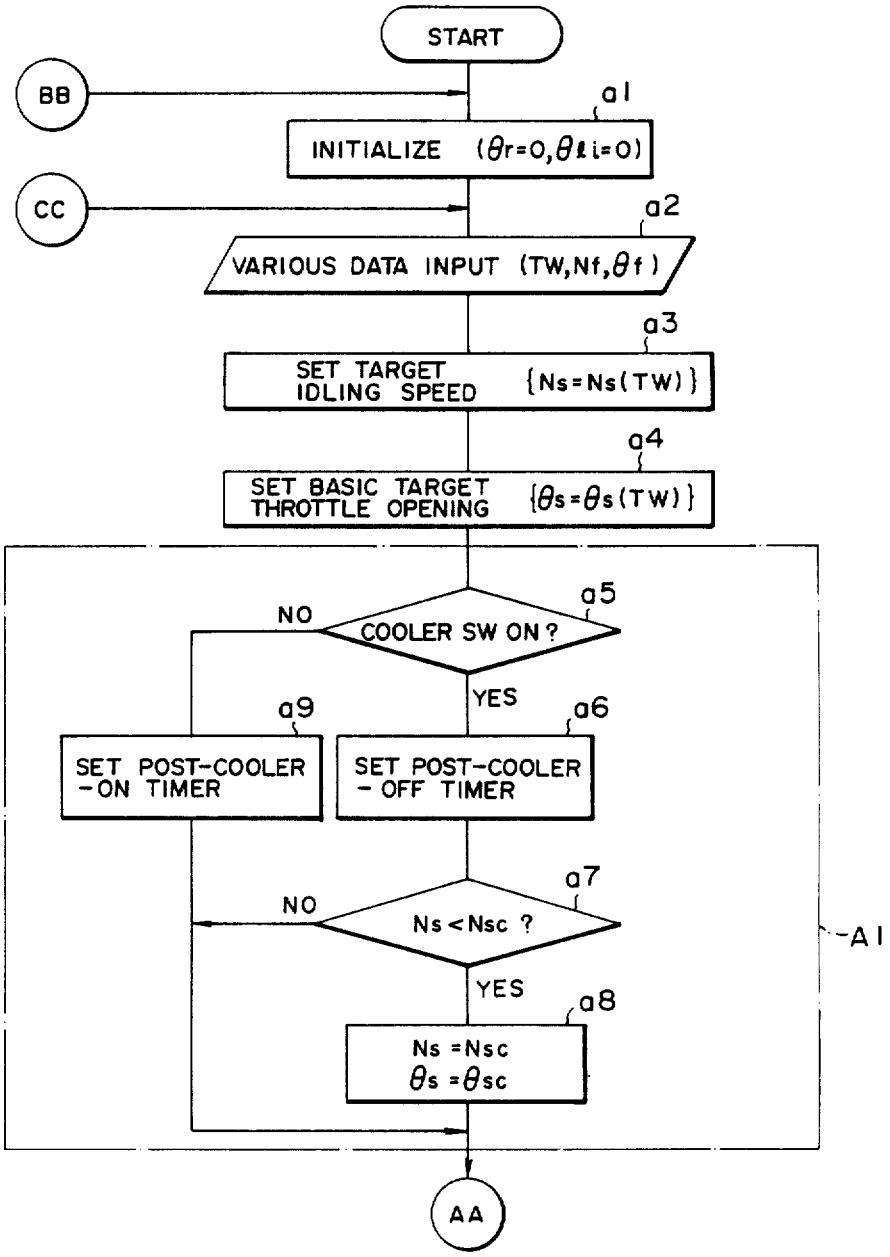
Figures 8, 8B:
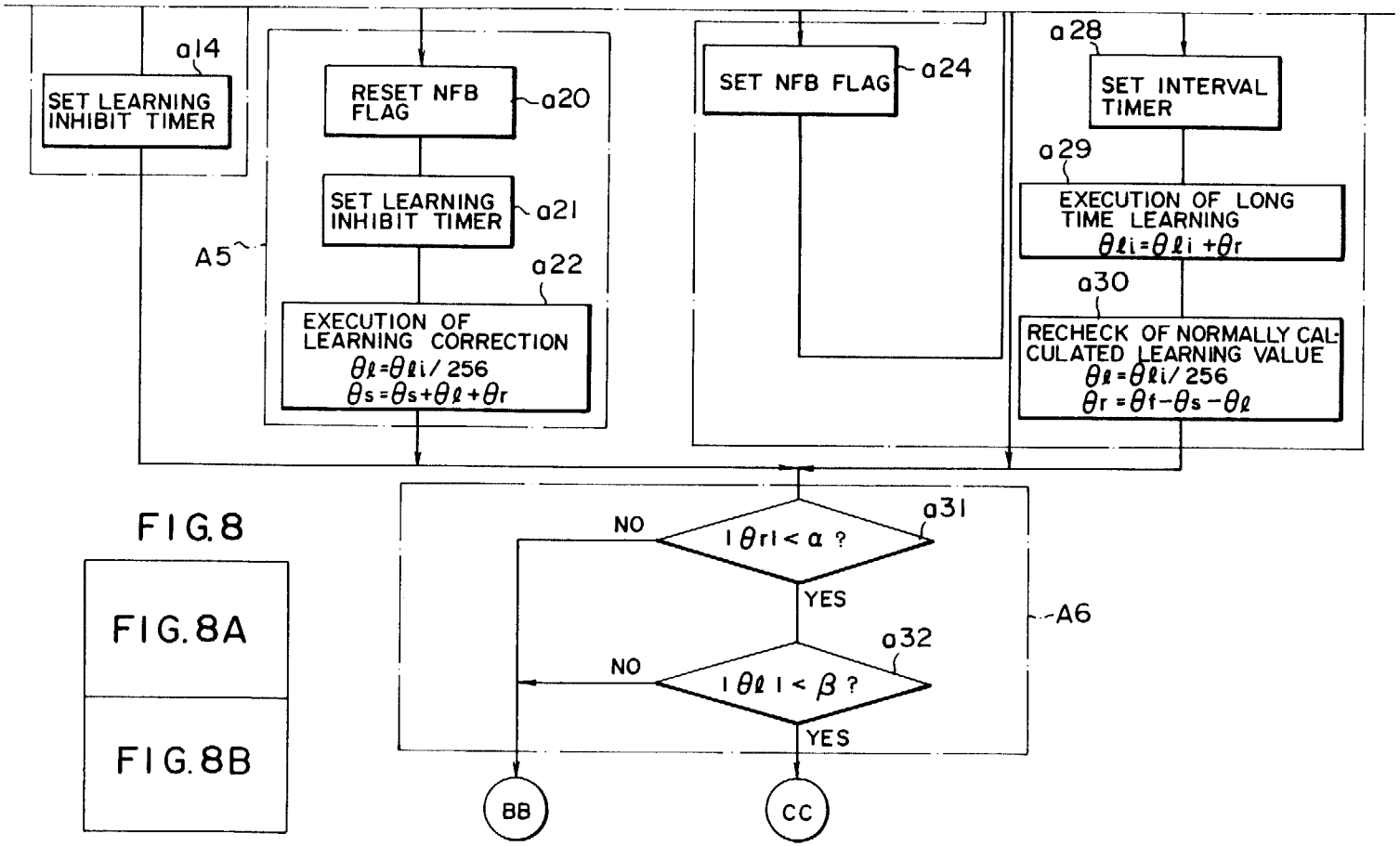
Figure 8A:
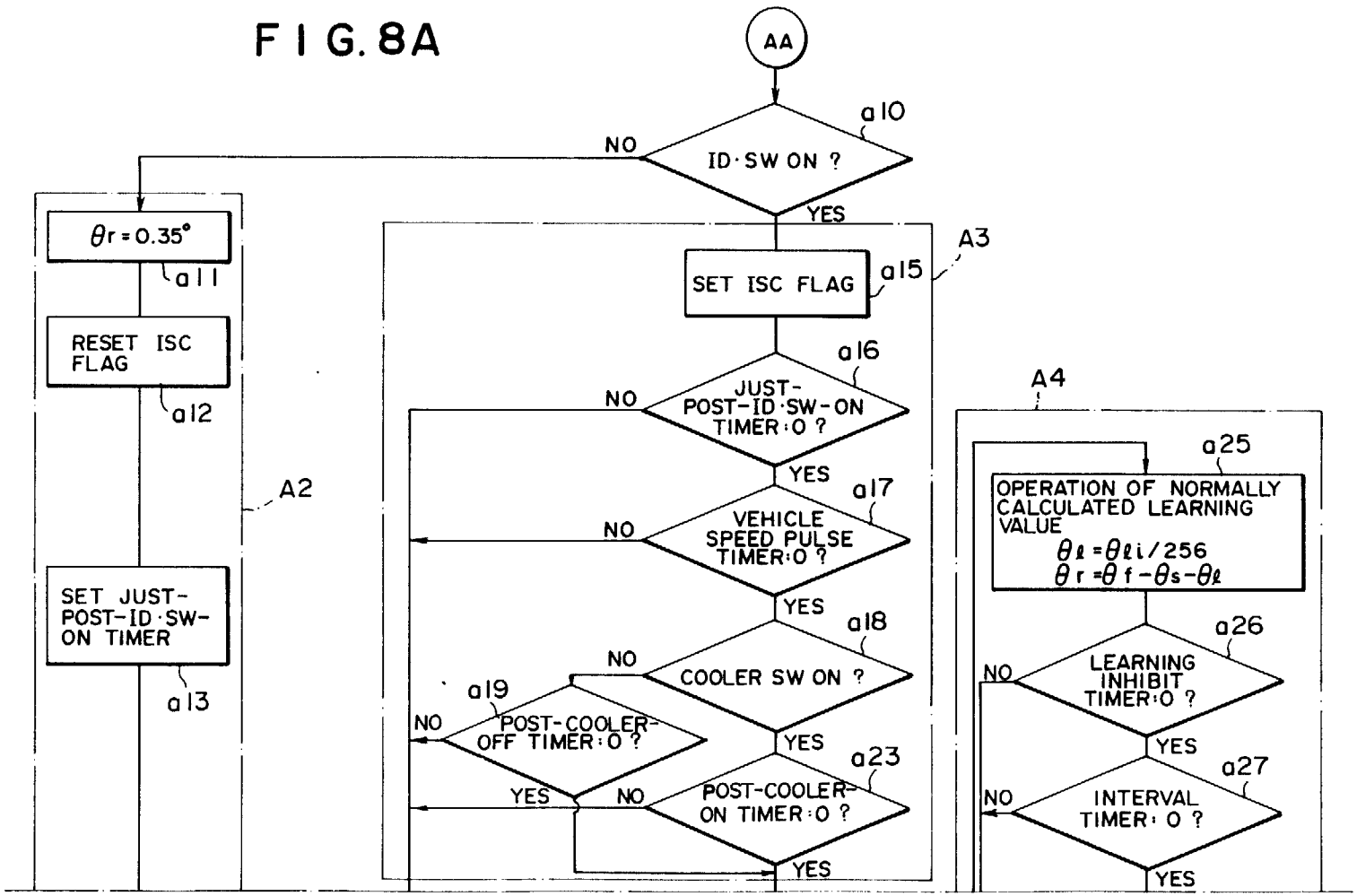

FIGS. 7 and 8 show processing flows of the first and second idling speed control means M1 and M1', long-time correction value learning means M2, just-previous correction value learning means M3, initializing means M5, operation control means M6, and first and second memory means M7 and M8, in the controller 29. Terminals AA, BB and CC in FIG. 7 are connected to terminals indicated by the same reference numerals in FIG. 8.

First, initialization is performed after turning ON of the ignition key switch and a real-time learning value $\theta r$ which is a just-previous correction value of the throttle opening stored in a predetermined address (this address constitutes the second memory means M8) of RAM, is reset, and a long-time learning integral value $\theta li$ of the throttle opening stored in a predetermined address (this address constitutes the first memory means M7) of stand-by RAM is reset only in an abnormal condition (voltage drop) of the stand-by RAM (step a1). The long-time learning integral value $\theta li$ serves as data base for obtaining a long-time correction value.

Then, various data (cooling water temperature TW, actual engine speed Nf, actual throttle opening $\theta f$) are input (step a2), and a target idling speed Ns(TW) and a basic target throttle opening $\theta s$(TW) both based on the cooling water temperature TW are determined from the map and set to target speed Ns and target throttle opening $\theta s$ respectively (steps a3 and a4).

Then, in block A1, whether the cooler switch (cooler SW) 38 is ON or OFF is judged (step a5), and if the cooler SW is ON, a post-cooler-OFF timer is preset (step a6), and if the target speed Ns is lower than a cooler-ON target speed Nsc (step a7), the cooler-ON target speed Nsc and cooler-ON target throttle opening $\theta sc$ are set to the target speed Ns and target throttle opening $\theta s$ respectively (step a8).

Where the target speed Ns is above the cooler-ON target speed Nsc, processing goes through NO route from step a7, so the target speed Ns and throttle opening $\theta s$ are maintained at the target speed Ns(TW) and throttle opening $\theta s$(TW) both based on the cooling water temperature.

If the cooler SW 38 is OFF, a post-cooler-ON timer is present (step a9), and the target speed Ns and throttle opening $\theta s$ are maintained at the target speed Ns(TW) and throttle opening $\theta s$(TW) both based on the cooling water temperature.

Thus, in block A1, setting of the target speed Ns and target throttle opening $\theta s$ is effected, and at the same time a count number corresponding to two seconds is preset to each of the post-cooler-ON timer and post-cooler-OFF timer as preparation for starting operation of a down counter at the time of on/off switching of the cooler.

Then, whether the idle switch (ID.SW) 25 is ON or OFF is judged (step a10). If the idle switch 25 is OFF, then in block A2, the learning of correction value in NFB control is inhibited, while if the idle switch 25 is ON, there are performed learning of correction value in NFB control and execution of learning correction in blocks A3 to A5.

In block A2, first the real-time learning value $\theta r$ is set to 0.35° in order to prevent decrease of the engine speed at the time of operation of electric loads (auxiliary machines) (step a11), provided it is set to 0° in the case where the decrease of the engine speed caused by operation of auxiliary machines is not considered. Here the real-time learning value $\theta r$ is initialized upon turning OFF of the idle switch 25; in other words, the initializing means M5 is constituted in steps a10 and a11.

Then, Idling Speed Control (ISC) Flag is reset (step a12) and a count number corresponding to two seconds is preset to a just-post-idle switch (ID SW)-ON timer (step a13), then because of off-idle state, a count number corresponding to five seconds is preset to the learning inhibit timer (step a14). Thus, in the processing in the off-idle state shown in block A2, the learning correction is not performed and processing advances to the next block A6.

In block A6, whether the absolute value of a real-time learning value (normally calculated value) $\theta r$ is smaller than a preset value $\alpha$ or not is judged (step a31), and whether the absolute value of a long-time learning value (long-time means value) $\theta l$ is smaller than a preset value $\beta$ or not is judged (step a32). If $|\theta r|<\alpha$ and $|\theta l|<\beta$, the processings from step a2 are executed again, beginning with re-input of data.

If $|\theta r|<\alpha$ and $|\theta l<\beta$ are not met, it is judged that the operating condition is abnormal, and the processings from step a1 are executed again, beginning with initialization.

If the idle switch 25 is ON, processing goes through YES route from stop a10 and reaches block A3, in which one of the engine speed feedback control in block A4 and the position feedback control in block A5 is selected by the function as the operation control means M6.

First, in block A3, ISC Flag is set (step a15) because the idle switch 25 is ON, then processing advances to block A4 when the just-post-idle switch-ON timer has elapsed two seconds after switching from OFF to ON of the idle switch 25 (step a16) and when the vehicle speed pulse timer indicates that the vehicle speed is zero (not higher than 2.0 km/h) (step a17) and when the cooler SW is ON and two seconds have elapsed after switching from OFF to ON (steps a18 and a23).

Processing reaches block A4 also when the just-post-idle switch-ON timer has elapsed two seconds after switching from OFF to ON of the idle switch 25 (step a16) and when the vehicle speed pulse timer indicates that the vehicle speed is zero (not higher than 2.0 km/h) (step a17) and when the cooler SW is OFF and two seconds have elapsed after switching from ON to OFF (steps a18 and a19).

In block A4, first in order to perform the engine speed feedback control, Engine Speed Feedback (NFB) Flag is set (step a24) and then the real-time learning value (normally calculated learning value) $\theta r$ is calculated as follows by the function as the just-previous correction value learning means M3 (step a25):

$$\theta l=\theta li/256 \quad (1)$$

$$\theta r=\theta f-\theta s-\theta l \quad (2)$$

wherein $\theta li$ is a long-time learning integral value and $\theta l$ is a long-time learning value.

Then, whether five seconds have elapsed or not after switching from OFF to ON of the idle switch 25 or after switching from PFB control to NFB control is judged by the learning inhibit timer (step a26), and if the answer is affirmative, judgement is made by an interval timer whether five seconds have elapsed or not after execution of the preceding long-time learning (step a27).

If the value of the interval timer is zero, that is, if five seconds have elapsed after execution of the long-time learning, a count number corresponding to five seconds is preset to the interval timer (step a28) and a long-time learning correction is made as follows by the function as the long-time correction value learning means M2 (step a29):

$$\theta li = \theta li + \theta r \quad (3)$$

Then, the real-time learning value (normally calculated learning value) is reviewed as follows by the function as the just-previous correction value learning means M3 (step a30):

$$\theta l = \theta li/256 \quad (4)$$

$$\theta r = \theta f - \theta s - \theta l \quad (5)$$

With the equations (3) and (4), when an integrated value of the real-time learning value $\theta r$ has become 256 or more, ($\theta r/256$) is reflected in the long-time learning value $\theta l$, while when it is less than 256, there is not preformed addition to the long-time learning value. In the equations (3) and (4), for multiplying the real-time learning value $\theta r$ by (1/256) and adding to the real-time learning value $\theta l$, each value is multiplied by 256 to conform to the integer value expression form of digital computer.

After execution of the equations (3) to (5), processing advanced to block A6.

Where five seconds have not elapsed after switching from OFF to ON of the idle switch 25 or after switching from PFB control to NFB control or where five seconds have not elapsed after execution of preceding long-time learning, processing goes from steps a26 and a27 directly to block A6 through NO route. In this case, a long-time learning correction is not performed.

Where it has been detected in block A3 that the position feedback control should be done, first NFB Flag is reset (step a20), then the learning inhibit timer is preset (step a21) and learning correction is carried out in accordance with the following equations (step a22):

$$\theta l = \theta li/256 \quad (6)$$

$$\theta s = \theta s + \theta l + \theta r \quad (7)$$

And processing advances to block A6.

In addition to the above main flow, there are provided such interruption processing flows as shown in FIGS. 9 to 12. These processing lows are executed sequentially in accordance with an interruption signal provided at every predetermined time from a clock or using a vehicle speed pulse as an interruption signal.

Figure 9:
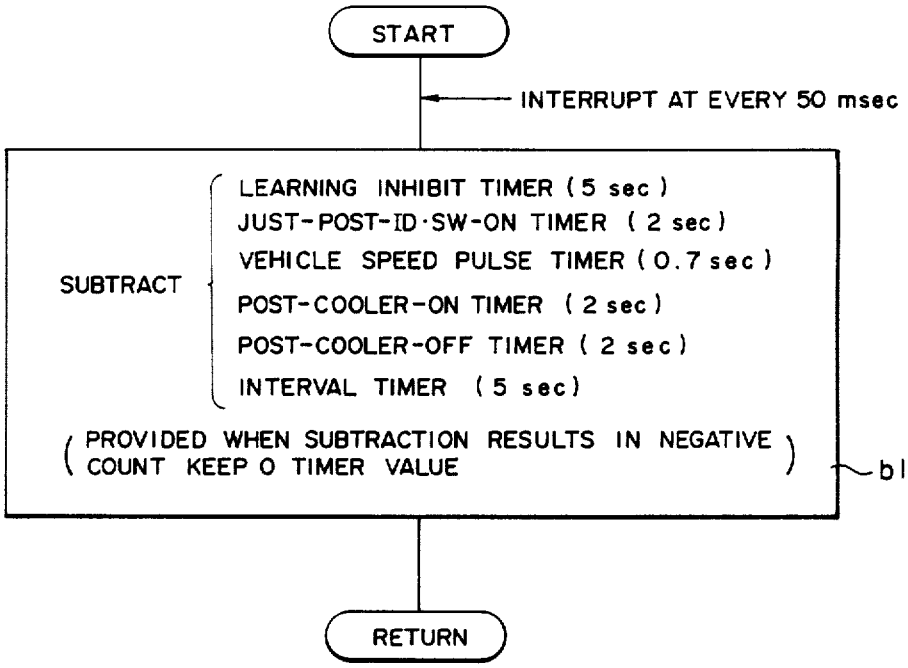

First, in a count-down routine of each timer, as shown in FIG. 9, the count number of each of learning inhibit timer, just-post-idle switch-ON timer, vehicle speed pulse timer, post-cooler-ON timer, post-cooler-OFF timer and interval timer is substracted (−1) in accordance with an interruption request signal provided at every 50 msec (step b1), and when the subtraction results in negative count, the timer count number is kept zero. Consequently, the count number of each timer becomes a value not smaller than 1 during the preset time, and the timer function is exhibited by comparing the count number with zero.

Figure 10:
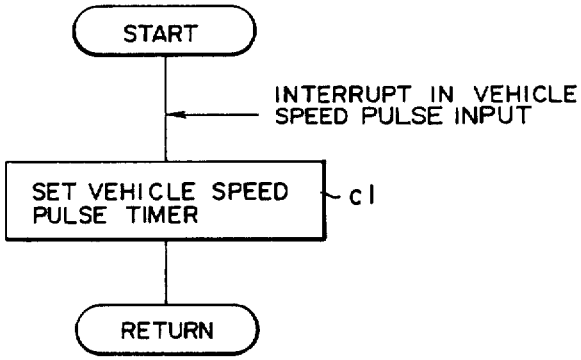

In a vehicle speed detecting routine, as shown in FIG. 10, the vehicle speed pulse timer is set to a count number corresponding to 0.7 second every time a vehicle speed pulse is provided from the vehicle speed sensor 24 (step c1), whereby the count number of the vehicle speed pulse timer is kept not less than 1 for 0.7 second after receipt of a vehicle speed pulse from the vehicle speed sensor 24, now ready for vehicle speed detection.

Figure 11:
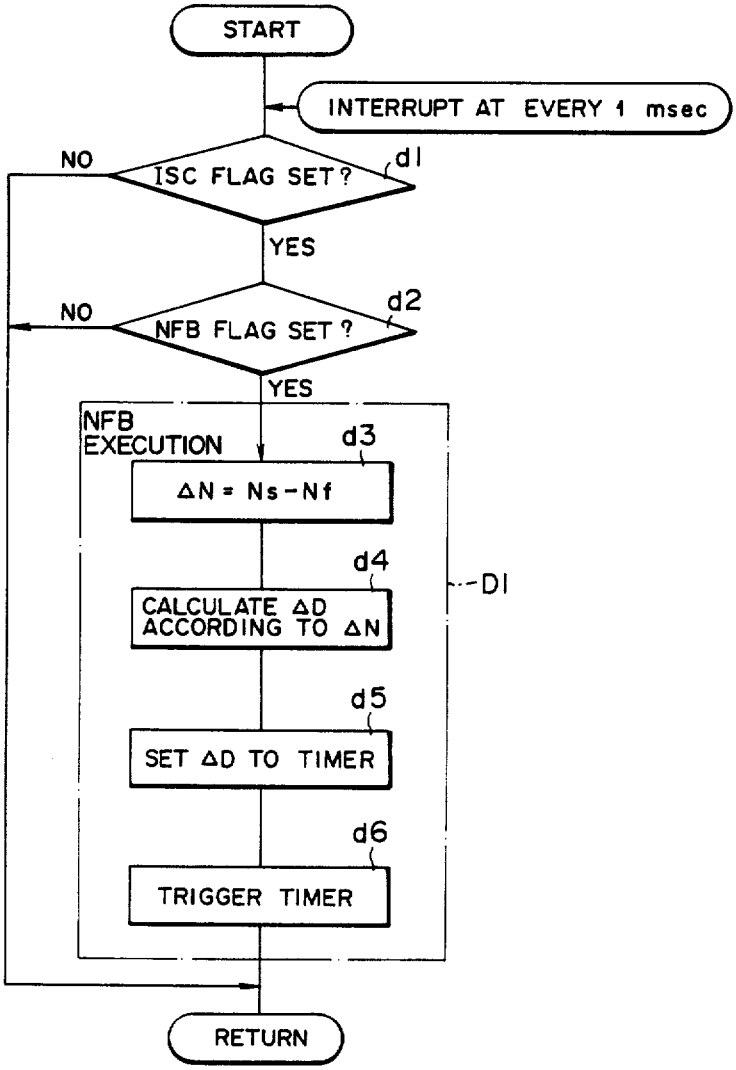

In an actuator driving routine for idling speed control (ISC) in NFB control, as shown in FIG. 11, NFB control is carried out in block D1 when the idle switch 25 is ON (ISC Flag is set) and when NFB Flag is set (steps d1 and d2) in accordance with an interruption request signal provided at every second.

In block D1, by the function as the first idling speed control means M1, a difference $\Delta N$ between target speed Ns and actual speed Nf is determined (step d3), then a driving time $\Delta D$ of the motor 13 proportional to the difference $\Delta N$ is calculated (step d4), this driving time $\Delta D$ as a first idling control signal is set to the motor timer (step d5), and the motor timer is triggered to thereby drive the motor 13 until the motor timer becomes zero (step d6).

Figure 12:
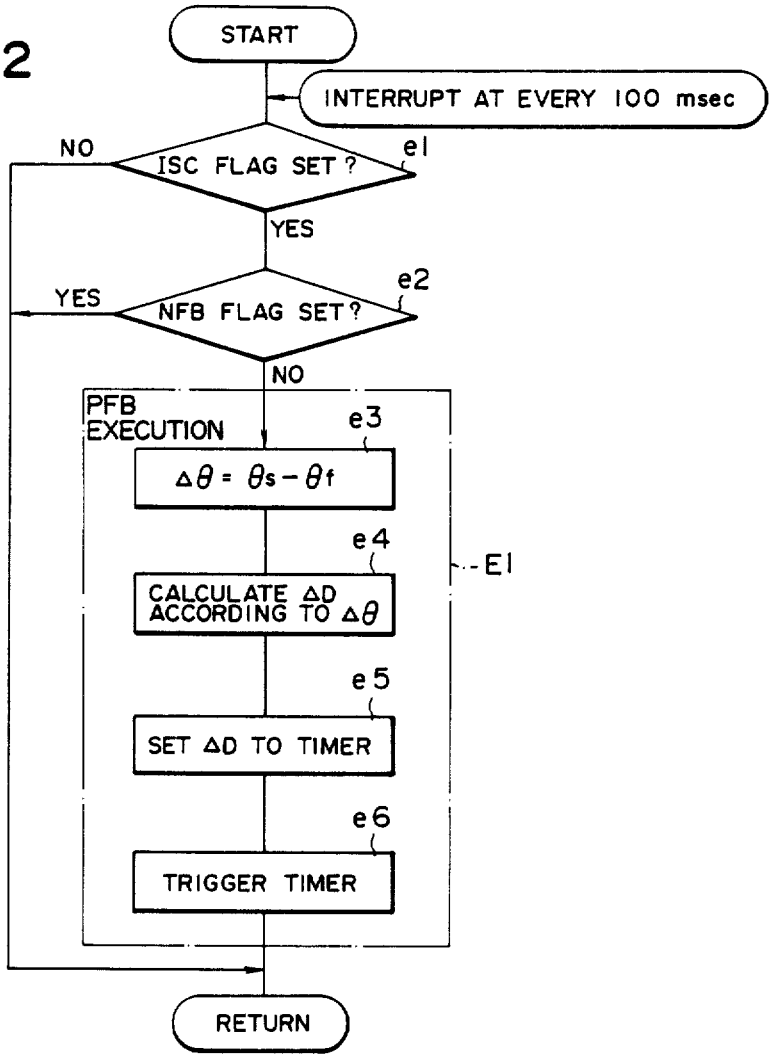

Further, in an actuator driving routine for idling speed control (ISC) in PFB control, as shown in FIG. 12, PFB control is carried out in block E1 when the idle switch 25 is ON (ISC Flag is set) and when NFB Flag is reset (steps e1 and e2) in accordance with an interruption request signal provided at every 100 msec.

In block E1, by the function as the second idling speed control means M1', a difference $\Delta\theta$ between target throttle opening $\theta s$ as an idling control signal which has been subjected to correction, etc. in the main routine and actual throttle opening $\theta f$ is determined (step e3), then a driving time $\Delta D$ of the motor 13 proportional to the difference $\Delta\theta$ is calculated (step e4), this driving time $\Delta D$ as a second idling control signal is set to the motor timer (step a5), and the motor timer is triggered to thereby drive the motor 13 until the motor timer becomes zero (step e6).

In the case of a positive $\Delta D$, the throttle valve 11 is driven to its opening side, while in the case of a negative $\Delta D$, the throttle valve 11 is driven to its closing side.

As a result, the engine is controlled in a target state in both the engine speed feedback control using the first idling control signal provided from the first idling speed control means M1 and the position feedback control using the second idling control signal provided from the second idling speed control means M1'. Thus, the engine idling speed can be controlled to an optimum condition.

Since the engine idling speed controlling system according to the first embodiment of the present invention is constructed as above, the controller 29 exhibits as follows its functions as the first and second idling speed control means M1 and M1', long-time correction value learning means M2 and just-previous correction value learning means M3.

(i) Function as the first idling speed control means M1:

In a relatively stable state of the engine with NFB control selected by the operation control means M6, the controller receives an engine cooling water temperature TW from the water temperature sensor 21 and a cooler ON or OFF signal from the cooler switch 38, compares the target idling speed Ns (steps a3, a4, a8) with an engine speed Nf from the engine speed sensor 17, takes a difference $\Delta N$ ($=Ns-Nf$) therebetween (step d3), calculates a first idling control signal $\Delta D$ proportional to the difference $\Delta N$ (step d4) and drives the motor 13 as the actuator 12. At this time, the target speed Ns may be changed according to signals from the other sensors 16, 18–20 and 22–28.

(ii) Function as the long-time correction value learning means M2:

In a relatively stable state of the engine with NFB control selected, a new long-time correction value $\theta l$ is calculated from a real-time learning value (just-previous correction value) $\theta r$ of throttle opening as will be described later and a long-time learning value (long-time correction value) $\theta l$ of throttle opening which has been stored, at every predetermined interval (5 seconds in this embodiment). That is, if the equations (3) and (4) in the foregoing steps a29 and a30 are rewritten in a real value expression form, the following equation is derived:

$$\theta l = \theta l + (\theta r/256) \quad (8)$$

wherein the coefficient (1/256) functions as a sensitivity coefficient, and the long-time correction value $\theta l$ is not greatly varied by the just-previous correction value $\theta_r$.

(iii) Function as the just-previous correction value learning means M3:

In a relatively stable state of the engine with NFB control selected, the projection degree of the rod 15 of the motor 13 is controlled in accordance with the processing flow of FIG. 11 so that the actual speed Nf from the engine speed sensor 17 becomes the target speed Ns, on the basis of an interruption signal provided at every second. As a result, the opening of the throttle valve 11 is controlled, which throttle opening is detected as an actual throttle opening $\theta f$ by the throttle sensor 20.

Figure 13:
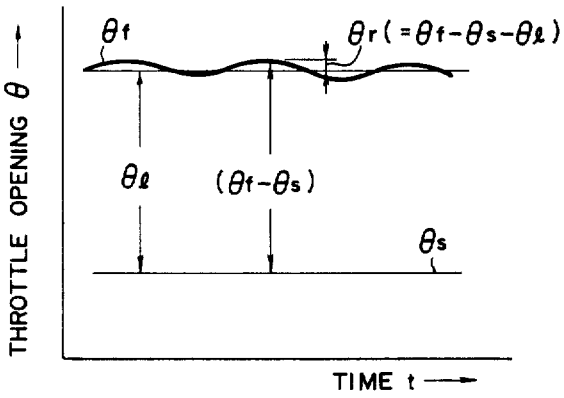
Figures 14, 14A:
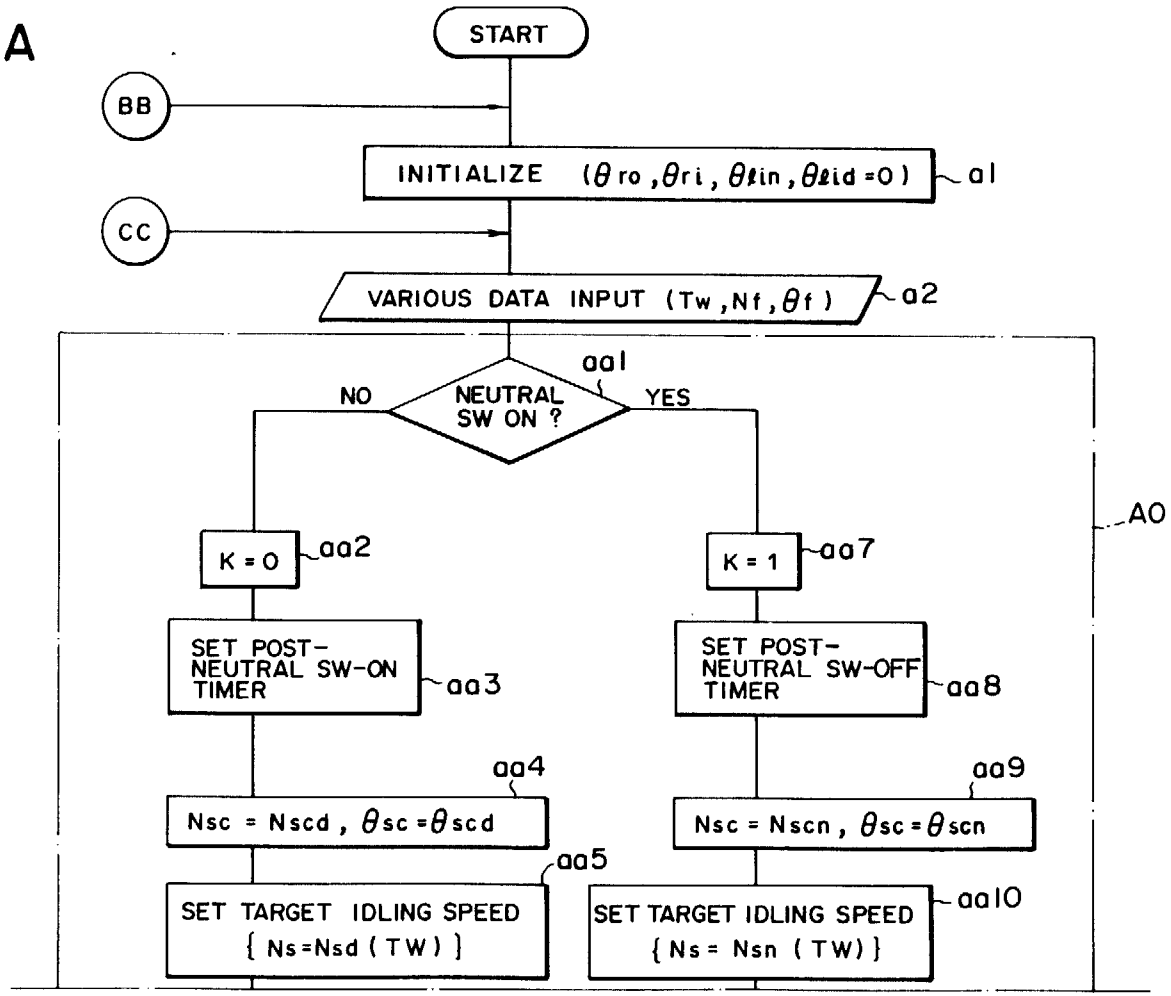
Figure 14B:
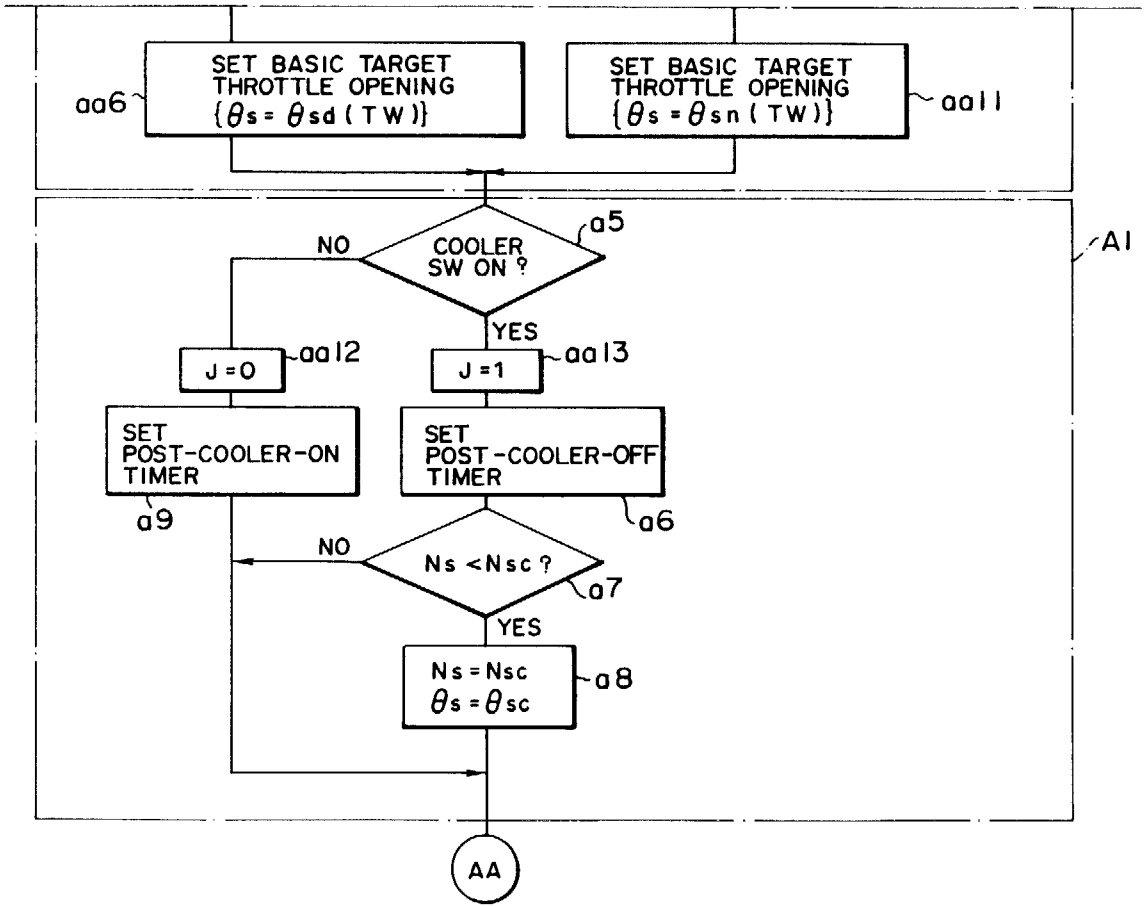
Figures 15, 15A:
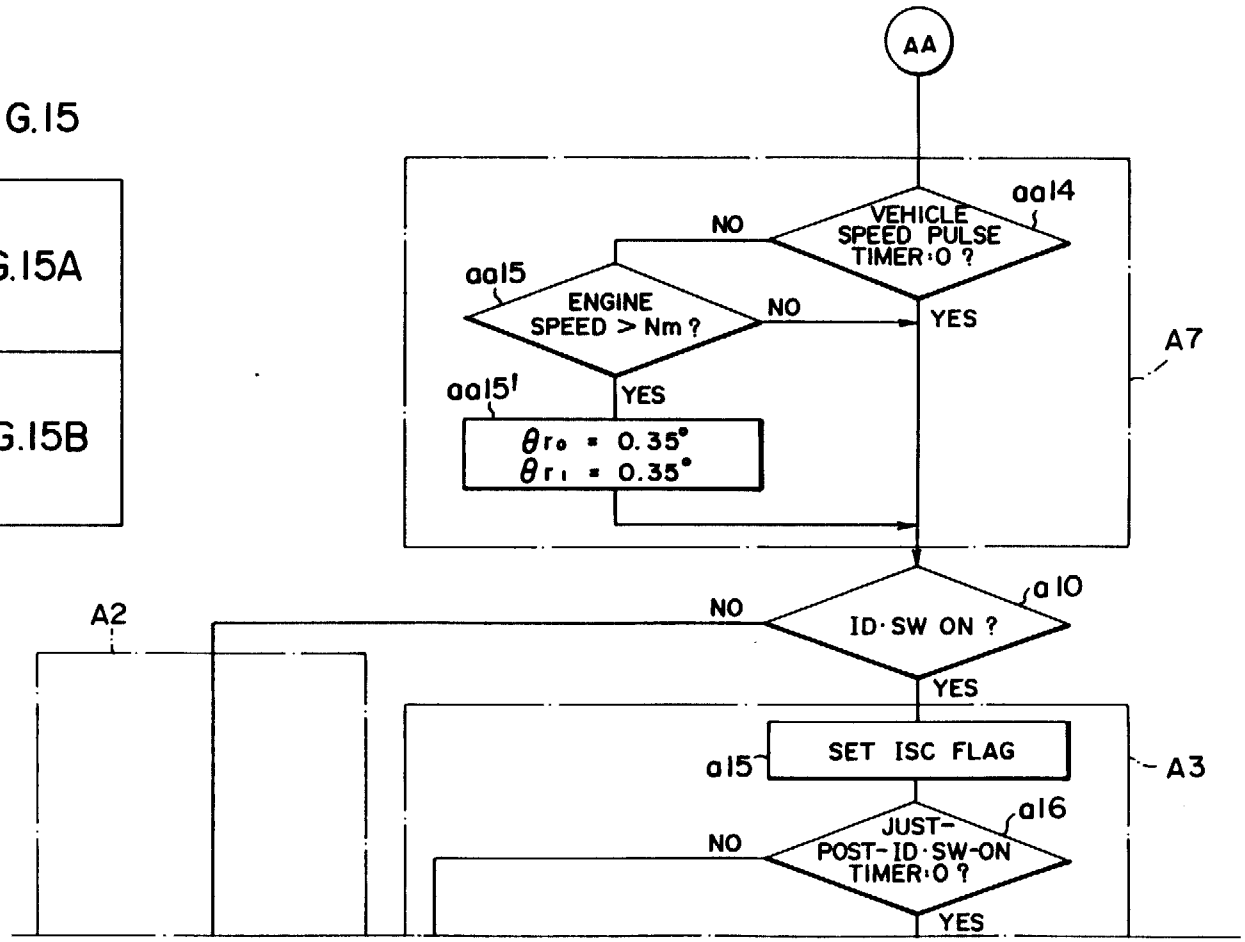
Figure 15B:
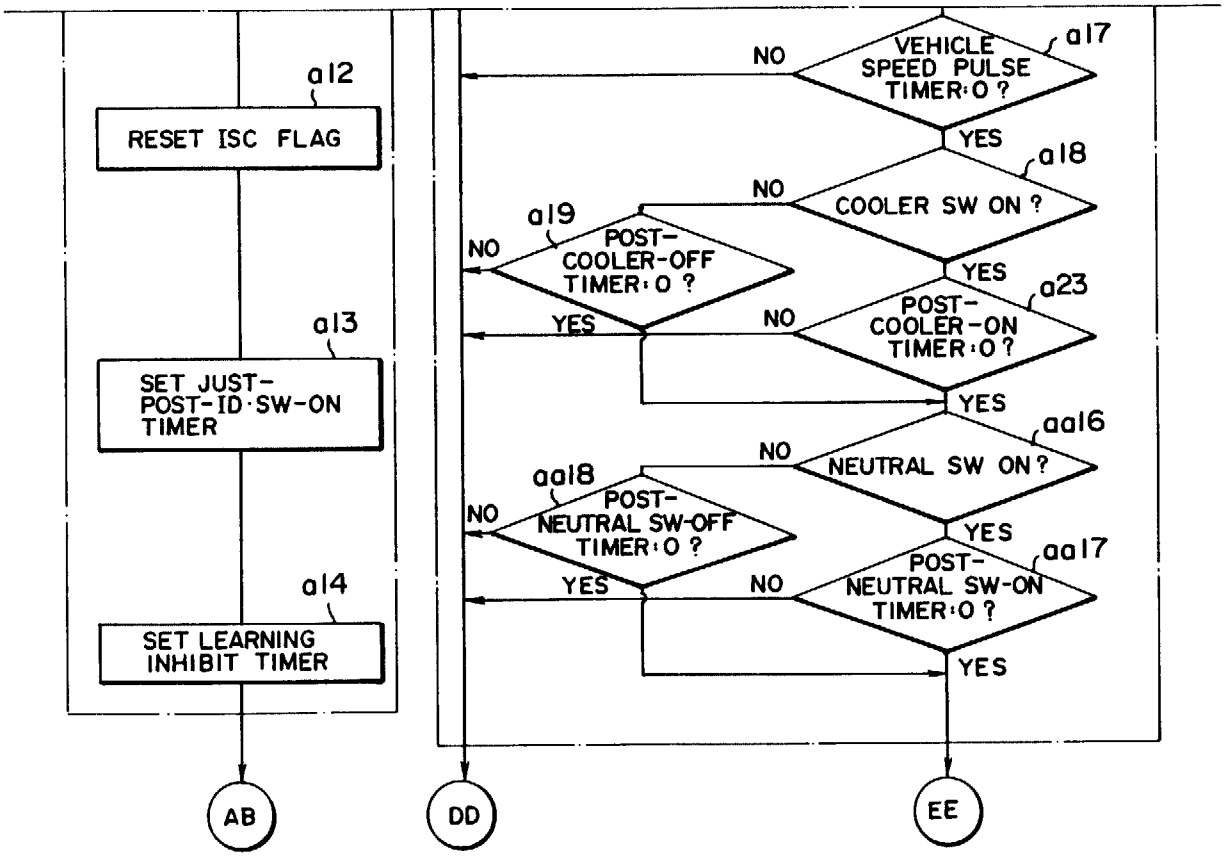
Figure 16:
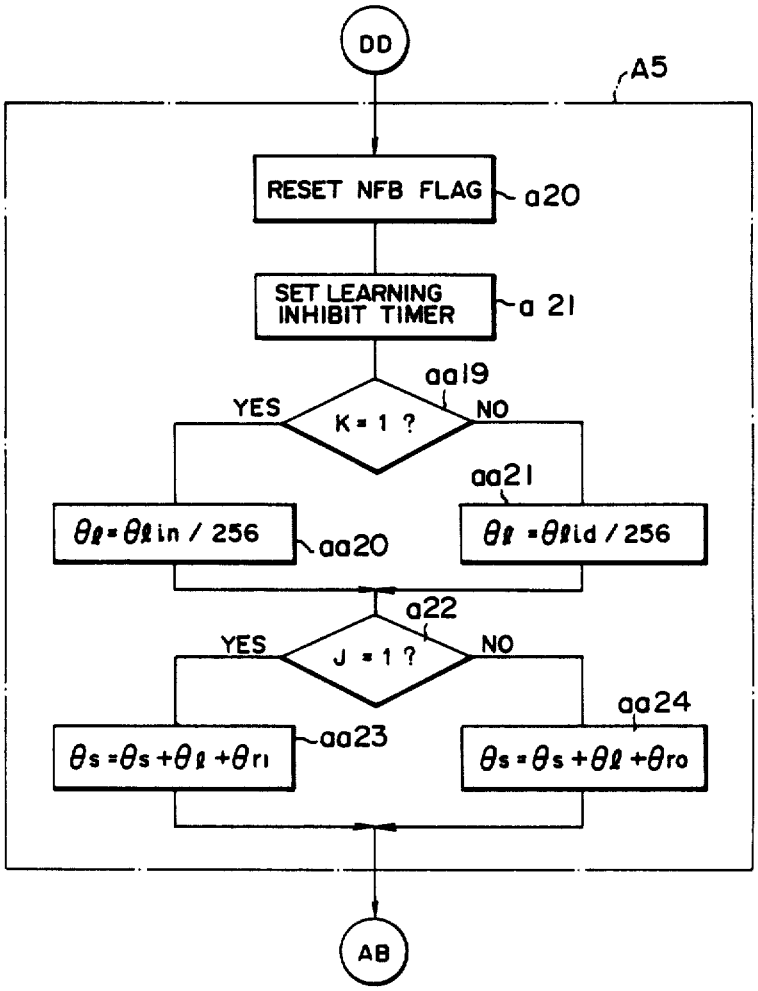
Figures 17, 17A, 17B:
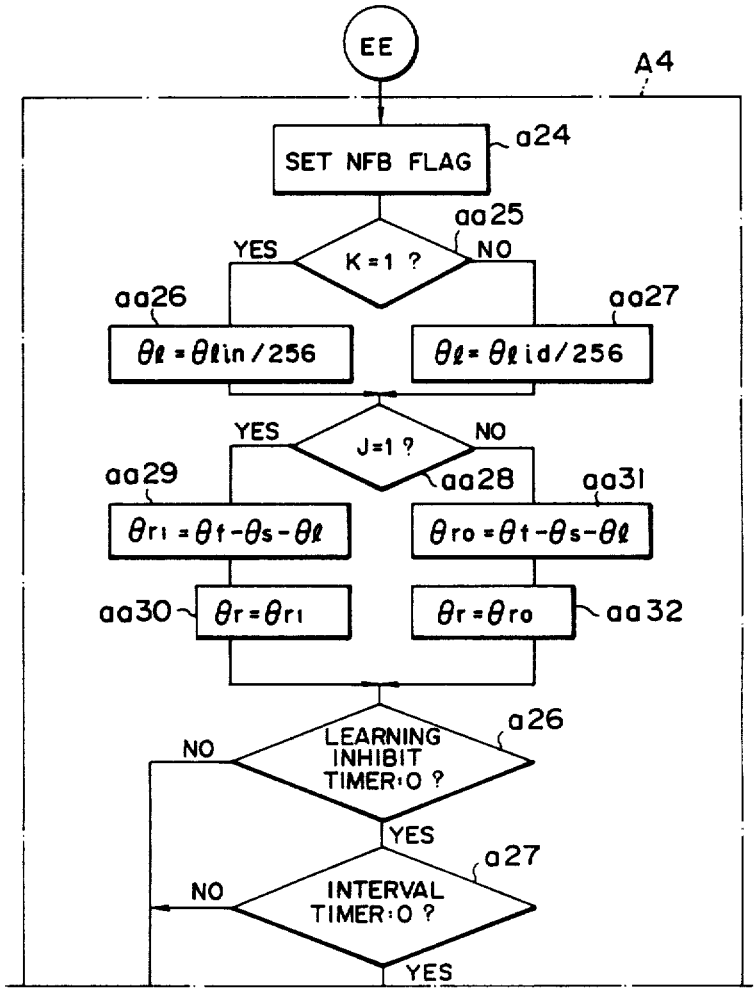
Figure 17B:
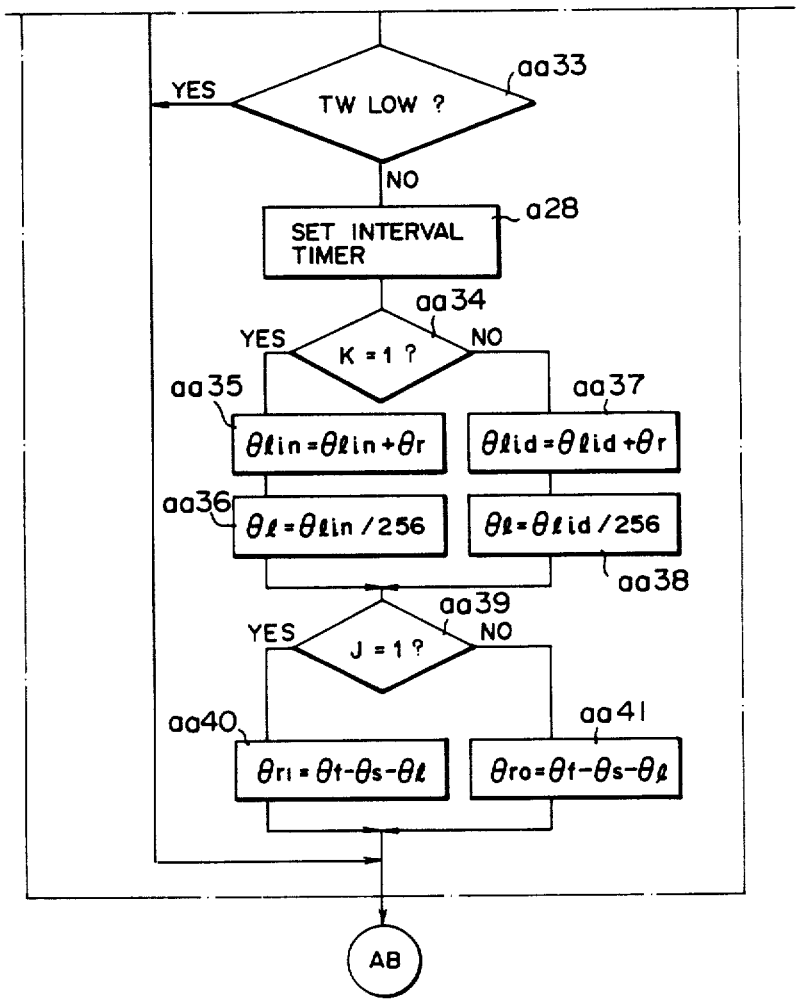
Figure 18:
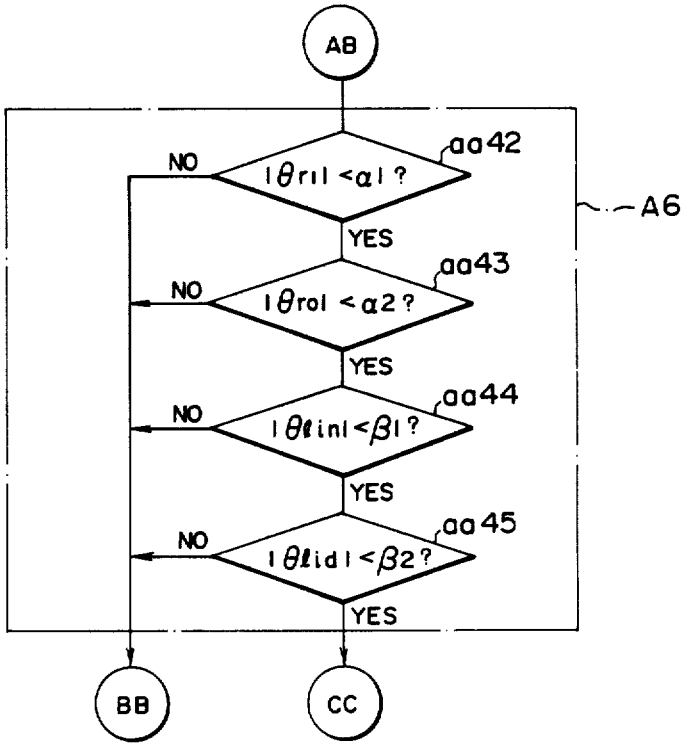

Since the target throttle opening $\theta s$ corresponding to the target speed Ns is determined in advance, an instantaneous value ($\theta f-\theta s$) of the correction value of the throttle sensor 20 is calculated from the said corresponding target throttle opening $\theta s$ and the actual throttle opening $\theta f$. And a real-time learning value $\theta r$ is calculated [see the equation (2)] as a value obtained by subtracting the long-time learning value $\theta l$ from the instantaneous value ($\theta f-\theta s$). This real-time learning value $\theta r$ takes a small absolute value falling under a predetermined positive or negative range from the long-time learning value $\theta l$, and its integrated value $\Sigma(\theta r)$ becomes nearly zero (see FIG. 13).

Function as the second idling speed control means M1':

In an unstable engine condition with PFB control selected by the operation control means M6, a corrected target throttle opening $\theta s$ is calculated [see equation (7)] from the long-time learning value $\theta l$ and real-time learning value $\theta r$ obtained in the just-previous NFB control and from the target throttle opening $\theta s$ obtained according to the present cooling water temperature TW and cooler ON or OFF condition, and the projection degree of the rod 15 of the motor 13 is controlled in accordance with the processing flow of FIG. 12 so as to give such corrected target throttle opening $\theta s$, whereby the throttle opening of the throttle valve 11 is controlled so as to become long- and short-timewise corrected target throttle opening $\theta s$.

In this way, where switching is made from NFB control to PFB control without operation of the accelerator pedal, that is, where the processing of block A5 is started after the processing of block A4, the correction required in NFB control at that instant can be executed directly because the real-time learning value $\theta r$ is equal to a detected value ($\theta f-\theta s-\theta l$) from the throttle sensor 20 in step a25.

In the case of return to PFB control after the accelerator pedal being once operated (at the time of transfer from off-idle to idle), that is, where the processing of block A5 is started after the processing of block A2, since the real-time learning value $\theta r$ is equal to a fixed value ($=0.35°$ or $0°$) in step a11, correction can be made with the long-time learning value $\theta l$ as a long-time mean value along or with the sum of the long-time learning value $\theta l$ and the fixed value.

An engine idling speed controlling system according to a second embodiment of the present invention will be described below with reference to FIGS. 14 to 21, in which the same reference numerals as in FIGS. 1–13 indicate almost same portions. This second embodiment relates to an automobile gasoline engine with automatic transmission (A/T) and is different from the first embodiment in the following points.

(1) As shown in broken line in FIGS. 1 and 2, the controlling system is provided with a neutral switch (neutral SW) 39 which comprises an inhibitor switch, and the result of detection from the neutral switch 39 is fed to the controller 29 (whereby in the controller 29 a shift position of the automatic tansmission, namely, whether it is neutral or a running position, is judged).

(2) When there is a vehicle speed ($\neq 0$) in an off-idle condition, the just-previous correction value is initialized (fixed).

(3) A long-time correction value corresponding to a shift position, namely, a neutral position (N range or P range) or a running position (D range, R range, 1st range, . . . ), of the automatic transmission is maintained.

(4) A short-time correction value according to ON or OFF of the air conditioner is maintained.

(5) As shown in broken line in FIG. 1, the controller 29 has a function as an updating inhibit means M9 to inhibit updating of the long-time learning value when the engine temperature is low.

(6) Target idling speed Ns and target throttle opening $\theta s$ corresponding to a shift position of the automatic transmission are maintained as a function of water temperature.

(7) The condition that a predetermined time should be elapsed from just after switching of the neutral switch is added as a condition for starting the engine speed feedback control.

FIGS. 14 to 18 show processing flows of first and second idling speed control means M1 and M1', long-term correction value learning means M2, just-previous correction value learning means M3, initializing means M5, operation control means M6, first and second memory means M7 and M8, and updating inhibit means M9, in the controller 29 according to the second embodiment. Terminals AA, AB, BB, CC, DD and EE in FIGS. 14 to 18 are connected to terminals of the same reference marks respectively in those figures.

First, initialization takes place after turning ON of the ignition key, and a real-time learning value (short-time learning value) $\theta rl$ of the throttle opening at time of air conditioner ON and that $\theta ro$ at time of air conditioner OFF, stored in predetermined addresses (which constitute the second memory means M8) of RAM, are reset, and a long-time learning integral value $\theta lin$ of the throttle opening in neutral range (including parking range)

and that θlid in running range (drive range, 1st range, 2nd range, reverse range), stored in predetermined addresses (which constitute the first memory means M7) of stand-by RAM, are reset only when the stand-by RAM is in an abnormal condition (voltage drop) (step a1). The long-time learning integral values θlin and θlid serve as base data for obtaining long-time correction values according to load conditions.

Then, various data (cooling water temperature TW, actual engine speed Nf, actual throttle opening θf) are input, and then in block AO a judgment is made as to wheter the neutral switch 39 is ON (step a2) (neutral range) or OFF (running range) (step aa1). If the neutral switch 39 is OFF, processing goes through NO route, and first Neutral SW Flag K is reset (=0) (step aa2), post-neutral SW-ON timer (2 sec) is set (step aa3), cooler-ON target speed for running range Nscd is set to cooler-ON target speed Nsc, and cooler-ON target throttle opening for running range θscd is set to cooler-ON target throttle opening θsc (step aa4, see FIGS. 20 and 2116). At the same time, target idling speed for running range Nsd(TW) and basic target throttle opening for running range θsd(TW) both based on cooling water temperature TW are obtained from a map and set to target speed Ns and target throttle opening θs respectively (steps aa5 and aa6).

Figure 20:
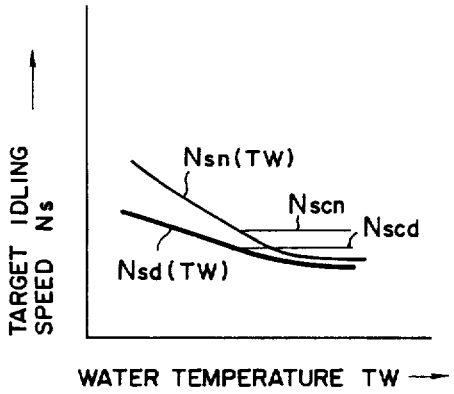
Figure 21:
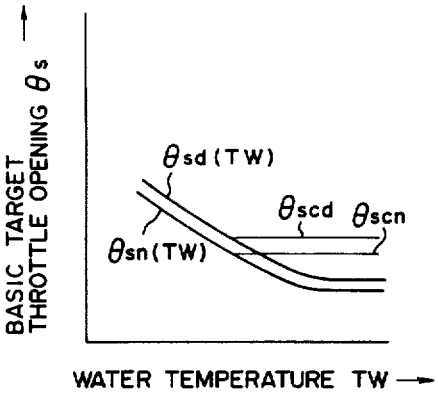

If the neutral switch 39 is ON, processing advances through YES route from step aa1, and first Neutral SW Flag K is set (=1) (step aa7), post-neutral SW-OFF timer (2 sec) is set (step aa8), cooler-ON target speed for neutral range Nscn is set to cooler-ON target speed Nsc, and cooler-ON target throttle opening for neutral range θscn is set to cooler-ON target throttle opening θsc (step aa9, see FIGS. 20 and 21). At the same time, target idling speed for neutral range Nsn(TW) and basic target throttle opening for neutral range θsn(TW) both based on cooling water temperature TW are obtained from a map and set to target speed Ns and target throttle openings θs respectively (steps aa10 and aa11).

Thus, in block AO, a count number corresponding to two seconds is preset to each of the post-neutral SW-ON timer and post-neutral SW-OFF timer as preparation for starting the operation of a down counter at the time of switching of the shift lever.

And in block A1, first a judgment is made as to whether the cooler switch (cooler SW) 38 is ON or OFF (step a5). If the cooler SW is ON, Cooler SW Flag J is set (=1) (step aa13), the post-cooler OFF timer is preset (step a6), and if the target speed Ns is lower than the cooler-ON target speed Nsc (step a7), the cooler-ON target speed Nsc and cooler-ON target throttle opening θsc are set to the target speed Ns and target throttle opening θs respectively (step a8). On the other hand, where the target speed Ns is higher than the cooler-ON target speed Nsc, since processing goes through NO route from step a7, the target speed Ns and target throttle opening θs are maintained respectively at the target speed Ns(TW) and target throttle opening θs(TW) both based on the cooler water temperature.

When the cooler SW 38 is OFF, Coller SW Flag J is reset (=0) (step aa12), the post-cooler-ON timer is preset (step a9), and the target speed Ns and target throttle openings θs are maintained respectively at the target speed Ns(TW) and target throttle opening θs(TW) both based on the cooling water temperature.

Thus, in block A1, not only there is performed setting of the target speed Ns and target throttle opening θs, but also a count number corresponding to two seconds is preset to each of the post-cooler-ON timer and post-cooler-OFF timer as preparation for starting the operation of the down counter at the time of on/off switching of the cooler.

Then, in block A7, in order to prevent the engine speed from decreasing upon operation of electric loads (auxiliary machines), the vehicle speed pulse timer (0.7 sec) detects a zero vehicle speed (not higher than 2.0 km/h) (step aa14), and if the engine speed is higher than a preset value Nm (e.g. 1,000 rpm) (step aa15), then real-time learning value θrl at time of air conditioner ON and real-time learning value θro at time of air conditioner OFF are initialized, namely each set to 0.35° (step aa15'). In the case where the decrease of the engine speed caused by operation of the auxiliary machines is not considered, θro and θrl are set to 0°.

Thus, in this embodiment, engine speed sensor 17 and vehicle speed sensor 24 are provided as operating condition detecting means, and initializing means M5 is constituted in block A7. The operating condition detecting means may be constituted by the vehicle speed sensor 24 alone, and in this case the initializing means M5 is constituted by only steps aa14 and aa15', that is, step aa15 is omitted. This initialization is performed also at the time of engine stop.

Then, whether the idle switch (ID.SW) 25 is ON or OFF is judged (step a10), and if the idle switch 25 is OFF, the correction value learning in NFB control is inhibited in block A2, while if the idle switch 25 is ON, the correction value learning and learning correction in NFB control are executed in blocks A3 to A5.

In block A2, first Idling Speed Control (ISC) Flag is reset (step a12) and a count number corresponding to two seconds is preset to a just-post-idle switch (ID SW)-ON timer (step a13), then because of off-idle condition, a count number corresponding to five seconds is preset to a learning inhibit timer (step a14).

Thus, in the off-idle processing shown in block A2, there is not performed learning correction, and processing reaches the next block A6.

In block A6, a judgment is made as to whether the absolute value of the real-time learning value (normally caculated value) θrl at time of air conditioner ON is smaller than a preset value α1 or not (step aa42), then judgment is made as to whether the absolute value of the real-time learning value (normally calculated value) θro at time of air conditioner OFF is smaller than a preset value α2 or not (step aa43), further judgment is made as to whether the absolute value of the long-time learning value (long-time mean value) θlin in the neutral range is smaller than a preset value β1 or not (step aa42), and further judgment is made as to whether the absolute value of the long-time learning value (long-time mean value) θlid in the running range is smaller than β2 or not (step aa45).

If $|\theta rl| < \alpha 1$, $|\theta ro| < \beta 2$, $|\theta lin| < \beta 1$ and $|\theta lid| < \beta 2$, the processings from step a2 are executed again, beginning with re-input of data. In order conditions than $|\theta r| < \alpha 1$, $|\theta ro| < \alpha 2$, $|\theta lin| < \beta 1$ and $|\theta lid| < \beta 2$ (other conditions than establishment of a11), it is judged that the operating condition is abnormal, and the processings from step a1 are executed again, beginning with initialization. Maximum and minimum values of the constants α1, β1 and β2 may be set to values different from each other.

If the idle switch 25 is ON, processing advances through YES route from step a10 and reaches block A3, in which one of the engine speed feedback control in block A4 and the position feedback control in block A5 is selected by the function as the operation control means M6.

First, in block A3, ISC Flag is set (step a15) because the idle switch 25 is ON, then processing reaches to block A4 when just-post-idle switch-ON timer has elapsed two seconds after switching from OFF to ON of the idle switch 25 (step a16) and when the vehicle speed pulse timer indicates a zero vehicle speed (not higher than 2.0 km/h) (step a17) and when two seconds have elapsed after switching from OFF to ON in cooler SW ON condition (steps a18 and a23) and when two seconds have elapsed after switching from OFF to ON in neutral SW ON condition (steps aa16 and aa17) or when two seconds have elapsed after switching from ON to OFF in neutral SW OFF condition (steps aa16 and aa18).

Processing reaches to block A4 also when the just-post-idle switch-On timer has elapsed two seconds after switching from OFF to ON of the idle switch 25 (Step a16) and when the vehicle speed pulse timer indicates a zero vehicle speed (not higher than 2.0 km/h) (step a17) and when two seconds have elapsed after switching from ON to OFF in cooler SW OFF condition (steps a18 and a19) and when two seconds have elapsed after switching from OFF to ON in neutral switch ON condition (steps aa16 and aa17) or when two seconds have elapsed after switching from ON to OFF in neutral SW OFF condition (steps aa16 and aa18).

In block A4, first in order to perform the engine speed feedback control, Engine Speed Feedback (NFB) Flag is set (step a4), then if Neutral SW Flag K is ON (=1) (step aa25), the long-time learning value $\theta l$ is calculated from long-time learning value (normally calculated learning value) $\theta lin$ in the neutral range in accordance with the following equation (step aa26):

$$\theta l = \theta lin/256 \quad (1)$$

If Neutral SW Flag K is OFF (=0), the long-time learning value $\theta l$ is calculated from long-time learning value (normally calculated learning value) id in the running range in accordance with the following equation (step aa27):

$$\theta l = \theta lid/256 \quad (1')$$

Then, if Cooler SW Flag J is ON (=1), the target throttle opening $\theta s$ and long-time learning value $\theta l$ are subtracted from actual throttle opening f in accordance with the following equation to obtain a real-time learning value $\theta rl$ at time of air conditioner ON (step aa29), which is set to the real-time learning value $\theta r$ by the function as the just-previous correction value learning means M3 (step aa30):

$$\theta rl = \theta f - \theta s = \theta l \quad (2a)$$

$$\theta r = \theta rl \quad (2b)$$

If Cooler SW Flag J is OFF (=0), the target throttle opening $\theta s$ and long-time learning value $\theta l$ are subtracted from actual throttle opening $\theta f$ in accordance with the following equation to obtain a real-time learning value $\theta ro$ at time of air conditioner OFF (step aa31), which is set to the real-time learning value $\theta r$ by the function as the just-previous correction value learning M3 (step aa32):

$$\theta ro = \theta f - \theta s - \theta l \quad (2'a)$$

$$\theta r = \theta ro \quad (2'b)$$

Then, five seconds have elapsed or not after switching from OFF to ON of the idle switch 25 or after switching from PFB control to NFB control is judged by the learning inhibit timer (step a26), and if the answer is YES, judgment is made by the interval timer as to whether five seconds have elapsed or not after execution of the just-previous long-time learning (step a27).

If the value of the interval timer is zero, that is, if five seconds have elapsed after execution of long-time learning and the cooling water temperature TW is high (step aa33), a count number corresponding to five seconds is preset to the interval timer (step a28), and if Neutral SW Flag K is ON (=1) (step aa34), correction of the long-time learning value $\theta lin$ in the Neutral range is carried out by the function as the long-time correction value learning means M2, using the real-time learning value $\theta r$, in accordance with the following equation (step aa35); that is, in this embodiment, updating inhibit means M9 is constituted in step aa33:

$$\theta lin = \theta lin + \theta r \quad (3)$$

Then the long-time learning value $\theta l$ is determined as follows on the basis of the long-time learning value $\theta lin$ in the neutral range (step aa36):

$$\theta l = \theta lin/256 \quad (4)$$

Then, if Neutral SW Flag K is OFF (=0) (step aa34), correction of the long-time learning value $\theta lid$ in the running range is carried out by the function as the long-time correction value learning means M2, using the real-time learning value $\theta r$, in accordance with the following equation (step aa37):

$$\theta lid = \theta lid + \theta r \quad (3')$$

Then, the long-time learning value $\theta l$ is determined as follows on the basis of the long-time learning value $\theta lid$ in the running range (step aa38):

$$\theta l = \theta lid/256 \quad (4')$$

Then, if Cooler SW Flag J is ON (=1) (step aa39), the target throttle opening $\theta s$ and long-time learning value $\theta l$ are subtracted from the actual throttle opening $\theta f$ in accordance with the following equation, and review of the real-time learning value (normally calculated learning value) at time of air conditioner ON is effected by the function as the just-previous correction value learning means M3 in accordance with the following equation (step aa40):

$$\theta r1 = \theta f - \theta x - \theta l \quad (5)$$

Then, if Cooler SW Flag J is OFF (=0) (step aa39), the target throttle opening $\theta s$ and long-time learning value $\theta l$ are subtracted from the actual throttle opening $\theta f$ in accordance with the following equation, and review of the real-time learning value (normally calculated learning value) at time of air conditioner OFF is effected as follows by the function as the just-previous correction value learning means M3 (step aa41):

$$\theta ro = \theta f - \theta s - \theta l \quad (5')$$

When an integrated value of the real-time learning value $\theta r$ becomes 256 or larger according to the equation (3), (3'), (4) and (4'), ($\theta r/256$) is reflected in the long-time learning value $\theta l$, while in the case of it being smaller than 256, there is not performed addition to the long-time learning value.

Thus, in the equations (3), (3'), (4) and (4'), for multiplying the real-time learning value $\theta r$ by (1/256) and adding to the real-time learning value $\theta l$, each value is multiplied by 256 to conform to the integer value expression form of a digital computer.

After execution of the equations (3), (3'), (4), (4'), (5) and (5'), processing reaches block A6.

When five seconds have not elapsed after switching from OFF to ON of the idle switch 25 or after switching from PFB control to NFB control, or when five seconds have not elasped after execution of the just-previous long-time learning, or when the cooling water temperature TW is low, processing reaches block A6 immediately through NO route from steps a26, a27 and aa33. In this case, there is not performed correction of long-time learning.

Where it is detected in block A3 that the position feedback control should be effected, first in block A5 NFB Flag is reset (step a20), then the learning inhibit timer is preset (step a21), and if Neutral SW Flag K is ON (=1) (step aa19), the long-time learning value $\theta l$ is determined as follows on the basis of the long-time learning value $\theta lin$ in the Neutral range (step aa20); that is, a learning correction is carried out in accordance with the following equation:

$$\theta l = \theta lin/256 \quad (6)$$

If Neutral SW Flag K is OFF (=0) (Step aa19), the long-time learning value $\theta l$ is determined as follows on the basis of the long-time learning value $\theta lid$ in the running range (step aa21):

$$\theta l = \theta lid/256 \quad (6')$$

Then, if Cooler SW Flag J is ON (=1) (step aa22), a new target throttle opening $\theta s$ is determined as follows by the addition of target throttle opening $\theta s$, long-time learning value $\theta l$ and real-time learning value $\theta rl$ at time of air conditioner ON (step aa23):

$$\theta s = \theta s + \theta l + \theta rl \quad (7)$$

If Cooler SW Flag J is OFF (=0) (step aa22), a new target throttle opening $\theta s$ is determined as follows by the addition of target throttle opening $\theta s$, long-time learning value $\theta l$ and real-time learning value $\theta ro$ at time of air conditioner OFF (step aa24):

$$\theta s = \theta s + \theta l + \theta ro \quad (7'l)$$

And processing reaches block A6.

In addition to the above main flow, there are provided such interruption processing flows as shown in FIG. 19 and FIGS. 10 to 12 in the first embodiment. These processing flows are executed sequentially using an interruption signal provided from a clock at every predetermined time or a vehicle speed pulse as an interruption signal.

Figure 19:
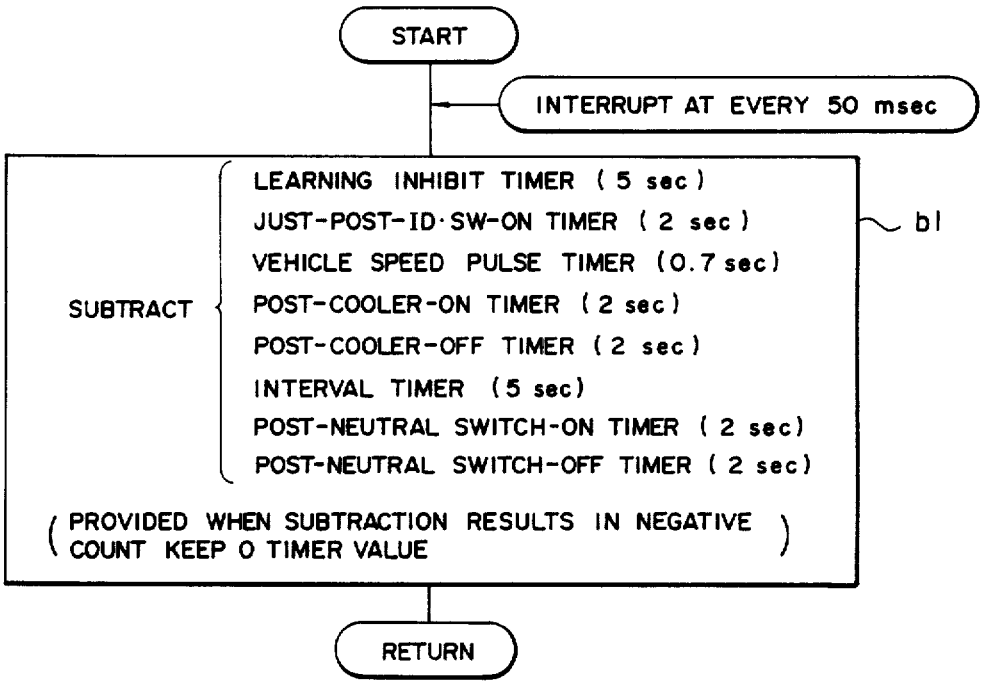

First, in a count-down routine of each timer, as shown in FIG. 19, the count number of each of learning inhibit timer (5 sec), just-post idle switch ON timer (2 sec.), vehicle speed pulse timer (0.7 sec.), post-cooler-ON timer (2 sec.), post-cooler-OFF timer (2 sec.), interval timer (5 sec.), post-neutral switch-ON timer (2 sec.) and post-neutral switch-OFF timer (2 sec.) is subtracted (−1) in accordance with an interruption request signal provided at every 50 msec (step b1), and when the subtraction results in negative count, the timer count number is kept zero. As a result, the count number of each timer becomes not smaller than 1 during a preset time, and the timer function is exhibited by comparing the counter number with zero.

Next, the processing shown in FIGS. 10 to 12 is executed in the same way as in the first embodiment.

By the above processings, the engine is controlled in a target condition in both the engine speed feedback control using the first idling control signal for the first idling speed control means M1 and the position feedback control using the second idling control signal form the second idling speed control means M1'. Thus, the engine idling speed can be controlled to an optimum condition.

Since the engine idling speed controlling system as the second embodiment of the present invention is constructed as above, the controller 29 exhibits as follows the functions as the first and second idling speed control means M1 and M1', long-time correction value learning means M2 and just-previous correction value learning means M3.

(i) Function as the first idling speed control means M1:

In a relatively stable state of the engine with NFB control selected by the operation control means M6, the controller receives an engine cooling water temperature TW from the water temperature sensor 21, a cooler ON or OFF signal from the cooler switch 38 and a range switching signal from the neutral switch 39, compares the target idling speed Ns obtained (steps a3, a4 and a8) with an engine speed Nf from the engine speed sensor 17, takes a difference $\Delta N$ (=Na−Nf) therebetween (step d3), calculates a first idling control signal $\Delta D$ proportional to the difference $\Delta N$ (step d4), and drives the motor 13 as the actuator 12. At this time, the target speed Ns may be changed according to signals from the other sensors 16, 18–20 and 22–28.

(ii) Function as the long-time correction value learning means M2:

In a relatively stable state of the engine with NFB control selected, a new long-time correction value $\theta l$ is calculated from a real-time learning value (just-previous correction value) $\theta rl$ or $\theta ro$ of throttle opening at time of air conditioner ON or OFF as will be described later and a long-time learning value (long-time correction value) $\theta lin$ or $\theta lid$ of throttle opening in the neutral range or running range which has been stored, at every predetermined interval (5 seconds in this embodiment). That is, if the equations (3), (3'), (4) and (4') in the foregoing steps a29 and a30 are rewritten in a real value expression from, the following equation is derived:

$$\theta l = \theta l + (\theta rl/256) \quad (8')$$

$$\theta l + \theta l + (\theta ro/256) \quad (9)$$

wherein the coefficient (1/256) functions as a sensitivity coefficient, and the long-time correction value $\theta l$ is not greatly varied by the just-previous correction values $\theta rl$ and $\theta ro$.

(iii) Function as the just-previous correction value learning means M3:

In a relatively stable state of the engine with NFB control selected, the projection degree of the rod 15 of the motor 13 is controlled in accordance with the processing flow of FIG. 11 so that the actual speed NF from the engine speed sensor 17 becomes the target speed Ns, on the basis of an interruption signal provided at every second. As a result, the opening of the throttle value 11 is controlled, which throttle opening is detected as an actual throttle opening $\theta f$ by the throttle sensor 20.

Since the target throttle opening $\theta s$ corresponding to the target speed Ns is determined in advance, an instantaneous value ($\theta f-\theta s$) of the correction value of the throttle sensor 20 is calculated from the said corresponding target throttle opening $\theta s$ and the actual throttle opening $\theta f$. And a real-time learning value $\theta r$ is calculated [see the equations (2a), (2b), (2'a) and (2'b)] as a value obtained by subtracting the long-time learning value $\theta l$ from the instantaneous value ($\theta f-\theta s$) according to cooler OFF. This real-time learning value $\theta r$ takes a small absolute value falling under a predetermined position or negative range from the long-time learning value $\theta l$, and its integrated values $\Sigma(\theta r)$, $\Sigma(\theta rl)$ and $\Sigma(\theta ro)$ become nearly zero (see FIG. 13).

(iv) Function as the second idling speed control means M1':

In an unstable engine condition with PFB control selected by the operation control means M6, a corrected target throttle openings $\theta s$ is calculated [see equations (7) and (7')] from the long-time learning value $\theta l$ and real-time learning value $\theta rl$ or $\theta ro$ at time of air conditioner ON and OFF obtained in the just-previous NFB control and from the target throttle openings $\theta s$ obtained according to the present cooling water temperature TW and cooler ON or OFF condition, and the projection degree of the rod 15 of the motor 13 is controlled in accordance with the processing flow of FIG. 12 so as to give such corrected target throttle opening $\theta s$, whereby the throttle opening of the throttle valve 11 is controlled so as to become long- and short-timewise corrected target throttle opening $\theta s$.

In this way, where switching is made from NFB control to PFB control without operation of the accelerator pedal, that is, where the processing of block A5 is started after the processing of block A4, the correction required in NFB control at that instant can be executed directly because the real-time learning value $\theta r$ is equal to a detected value ($\theta f-\theta s-\theta l$) from the throttle sensor 20 in step a25.

In the case of return in PFB control after the accelerator pedal being once operated (at the time of transfer from off-idle to idle), that is, where the processing of block A5 is started after the processing of block A2, since the real-time learning value $\theta r$ is equal to a fixed value (=0.35° or 0°) in step a11, correction can be made with the long-time learning value $\theta l$ as a long-time mean value along or with the sum of the long-time learning value $\theta l$ and the fixed value.

According to the engine idling speed controlling system as the second embodiment, the following effects or advantages can be obtained.

(1) In such a running condition as racing with vehicle speed being zero (during stop) or tapping (slight depression of the accelerator pedal), during off-idle, since the just-previous auxially value is hold (fixed), in other words, since the initialization of the just-previous learning value (short-time learning value) is not performed, a learning correction from the initial value up to an appropriate learning value is not performed at every racing or the like, whereby the fluctuation of the idling speed can be prevented.

(2) Since the long-time learning value $\theta lin$ or $\theta lid$ can be held according to a shift position of the automatic transmission, namely, at every neutral range (including parking range) or running range (drive range, 1st range, 2nd range and reverse range), the correction for absorbing friction loss changes of the engine caused by a secular change can be held for each shift range.

(3) Since the short-time learning value $\theta rl$ or $\theta ro$ can be held at every turning ON or OFF of the air conditioner, the idling speed can be controlled appropriately in a frequently ON/OFF switching condition of the air conditioner according to vehicular surrounding conditions (e.g. a difference in temperature between sunshine and shade).

(4) At low temperatures, it is possible to inhibit updating of long-time learning value and avoid an unstable learning correction with large friction loss.

(5) Target speed Ns and target throttle opening $\theta s$ can be set as shown in FIGS. 20 and 21, and the target speed Nsd in the running range can be set smaller than the target speed Nsn in the neutral range, thus contributing to the prevention of creep.

The target throttle openings $\theta sd$ and $\theta sn$ in the running and neutral ranges shown in FIG. 21 may be rendered same in characteristics.

(6) Since the elasped time just after switching of the neutral SW is added as a starting condition for the NFB control, it is possible to eliminate unnatural changes of the throttle opening after switching of range, thus ensuring a stable control.

Other than the change-over control for the target throttle openings $\theta s$ in the first and second embodiments, there may be adopted a dash-pot mode in which the throttle opening is decreased gradually without its abrupt decrease in order to prevent the production of a large quantity of unburn gas in a decreasing condition of the throttle valve opening. The target throttle opening in such dash-pot mode may be obtained from a map or the like.

The interval of generation of each interruption signal described above is an example.

Although in the above first and second embodiment it is assumed that a pair of electromagnetic fuel injection valves 9 and 10 of different capacities are normally in operation and that the fuel injection quantity is controlled by controlling the injection time width, the injection valves 9 and 10 may be switched over as necessary.

Figure 22:
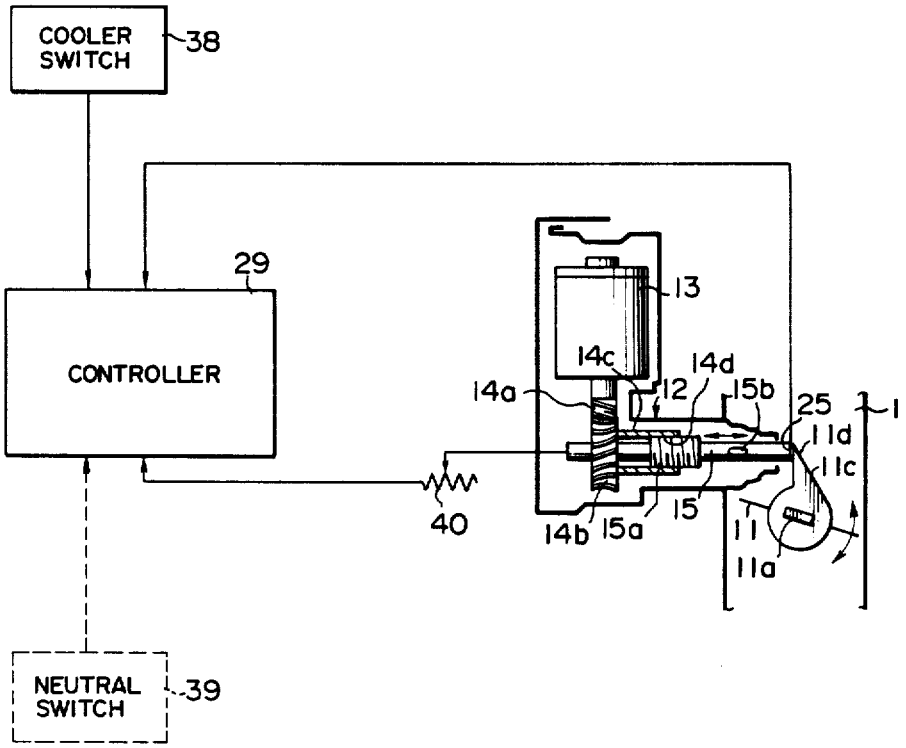
FIG. 22 is a block diagram of a principal portion of an engine idling speed controlling system, showing a modification of a throttle position sensor used in the above embodiments of the invention.

Although the throttle sensor 20 which directly detects the opening of the throttle valve 11 is used as the throttle position sensor in the above first and second embodiments, there may be used a motor position sensor 40 as the actuator position sensor without using the throttle sensor 20, as shown in FIG. 22. The motor position sensor 40 can detect a position (projection degree) of the rod 15, whereby the opening of the throttle valve 11 which is in abutment with the rod 15 can be detected indirectly.

Thus, upon receipt of a signal indicative of the position of the rod 15 from the motor position sensor 40 and an ON signal from the idle switch 25, the controller 29 can detect an opening of the throttle valve 11, and by comparing this opening signal with a target position of the rod 15 corresponding to the target throttle opening, it is possible to effect the position feedback control for the throttle valve 11.

What is claimed is:

1. An engine idling speed controlling system including:

a stopper member for restricting a stop position on a closing side of a throttle valve mounted in an intake passage of an engine;

an actuator for actuating said stopper member to change said closing side stop position to thereby control the opening of the throttle valve;

a throttle position sensor for detecting an opening of the throttle valve;

an engine speed sensor for detecting the number of revolutions of the engine;

a first idling speed control means for comparing a detected signal from said engine speed sensor with a target idling speed of the engine when the throttle valve is under control by said actuator and providing to the actuator a first idling control signal obtained from the result of said comparison;

a second idling speed control means for comparing a detected signal from said throttle position sensor with a target idle opening of the throttle valve when the throttle valve is under control by said actuator and providing to the actuator a second idling control signal obtained from the result of said comparison;

an operation control means for controlling the operation of said first idling speed control means and that of said second speed control means; and a correction value learning means for learning a correction value for said second idling control signal on the basis of a detected signal from said throttle position sensor during operation of said first idling speed control means, said correction value learning means being constructed so as to determine as said correction value both a long-time correction value based on a cumulative evaluation of detected signals from said throttle position sensor during operation of said first idling speed control means and a just-previous correction value based on the newest detected signal from said throttle position sensor during operation of said first idling speed control means, and said second idling speed control means being constructed so as to receive the long-time correction value and just-previous correction value determined by said correction value learning means and obtain said second idling control signal in order to reflect the learning results of said correction value learning means in said second idling control signal.

2. An engine idling speed controlling system according to claim 1, wherein said correction value learning means has a just-previous correction value learning means for comparing a detected signal from said throttle position sensor during operation of said first idling speed control means with said target idle opening, calculating a deviation therebetween and determining said just-previous correction value from a difference between said deviation data and said long-time correction value, and a long-time correction value learning means for obtaining said long-time correction value by a cumulative evaluation of the just-previous learning value obtained by said just-previous correction value learning means.

3. An engine idling speed controlling system according to claim 1, further including a first memory means for storing data on said long-time correction value, a second memory means for storing data on said just-previous correction value, an operating condition detecting means, and an initializing means for initializing the data stored in said second memory means with a predetermined operating condition provided from said operating condition detecting means, and in that said second idling speed control means is constructed so as to receive the data stored in said first memory means and the data stored in said second memory means and obtain said second idling control signal.

4. An engine idling speed controlling system according to claim 3, wherein said operating condition detecting means comprises an idle sensor for detecting whether said throttle valve is under control by said actuator or not, and said predetermined operating condition corresponds to an operating condition in which said throttle valve is away from the control by said actuator.

5. An engine idling speed controlling system according to claim 3, wherein said engine is a vehicular engine, said operating condition detecting means comprises a vehicle speed sensor, and said predetermined operating condition corresponds to a vehicular running condition.

6. An engine idling speed controlling system according to claim 3, wherein said engine is a vehicular engine, said operating condition detecting means comprises a vehicle speed sensor and said engine speed sensor, and said predetermined operating condition corresponds to a vehicular running condition in which the engine speed exceeds a preset value.

7. An engine idling speed controlling system according to claim 3, further including a load sensor for detecting a loaded condition of the engine and in that said correction value learning means is constructed so as to obtain said long-time correction value for each load condition of the engine in accordance with a detected signal from said load sensor, said first memory means is constructed so as to store the data on said long-time correction value for each load condition of the engine, and said second idling speed control means is constructed so as to receive from said first memory means the data on said long-time correction value for each load condition of the engine according to each said engine load condition in accordance with a detected signal from said load sensor at the time of obtaining said second idling control signal.

8. An engine idling signal controlling system according to claim 7, wherein said engine is an engine for a vehicle having an automatic transmission, said load sensor comprises a neutral switch which detects whether a shift position of said automatic transmission is Neutral or not, and said engine load conditions comprise a load condition in which a shift position of said automatic transmission is Neutral and a load condition in which a shift position of said automatic transmission is not Neutral.

9. An engine idling speed controlling system according to claim 3, further including a load sensor for detecting a loaded condition of the engine and in that said correction value learning means is constructed so as to obtain said just-previous correction value for each load condition of the engine in accordance with a detected signal from said load sensor, said second memory means is constructed so as to store the data on said just-previous correction value for each load condition of the engine, and said second idling speed control means is constructed so as to receive from said second memory means the data on said just-previous correction value for each load condition of the engine according to each said engine load condition in accordance with a detected signal from said load sensor at the time of obtaining said second idling control signal.

10. An engine idling speed controlling system according to claim 9, wherein said engine is constructed so as to drive a cooler compressor, and said load sensor comprises a cooler switch which detects an operating condition of said cooler compressor.

11. An engine idling speed controlling system according to claim 1, wherein said correction value learning means is constructed so as to update said long-time correction value and said just-previous correction value repeatedly so that the updating interval of said long-time correction value is longer than that of said just-previous correction value.

12. An engine idling speed controlling system according to claim 1, further including a temperature sensor for detecting a temperature of said engine and in that said correction value learning means is constructed so as to update said long-time correction value and said just-previous correction value repeatedly and also constructed so as to receive a detected signal from said temperature sensor and inhibit the updating of said long-time correction value when the engine temperature is below a preset value.

13. An engine idling speed controlling system according to claim 1, wherein said throttle position sensor comprises a throttle sensor attached to said throttle valve and adapted to detect an opening of said throttle valve directly.

14. An engine idling speed controlling system according to claim 1, wherein said throttle position sensor comprises an actuator position sensor attached to said actuator or said stopper member and adapted to indirectly detect an opening of said throttle valve which is under control by said actuator.

* * * * *